United States Patent
Yu et al.

(10) Patent No.: US 12,555,526 B2
(45) Date of Patent: *Feb. 17, 2026

(54) DRIVING CIRCUIT, DRIVING METHOD, DRIVING MODULE AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ziyang Yu, Beijing (CN); Haijun Qiu, Beijing (CN); Ming Hu, Beijing (CN); Zhiliang Jiang, Beijing (CN); Tianyi Cheng, Beijing (CN); Jianpeng Wu, Beijing (CN); Qingqing Yan, Beijing (CN); Xiangnan Pan, Beijing (CN); Qing He, Beijing (CN); Quanyong Gu, Beijing (CN); Sifei Ai, Beijing (CN); Junhao Jing, Beijing (CN); Xiang Luo, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 195 days.

This patent is subject to a terminal disclaimer.

(21) Appl. No.: 18/287,520

(22) PCT Filed: Dec. 19, 2022

(86) PCT No.: PCT/CN2022/140046
§ 371 (c)(1),
(2) Date: Oct. 19, 2023

(87) PCT Pub. No.: WO2024/130493
PCT Pub. Date: Jun. 27, 2024

(65) Prior Publication Data
US 2025/0078739 A1    Mar. 6, 2025

(51) Int. Cl.
*G09G 3/3225* (2016.01)
*G09G 3/3266* (2016.01)
(Continued)

(52) U.S. Cl.
CPC ........ *G09G 3/3225* (2013.01); *G09G 3/3266* (2013.01); *G09G 3/3258* (2013.01);
(Continued)

(58) Field of Classification Search
CPC ............... G09G 3/3225; G09G 3/3266; G09G 2300/0819; G09G 2300/0842;
(Continued)

(56) References Cited

U.S. PATENT DOCUMENTS 11,715,408 B1 * 8/2023 Zhang ................... G11C 19/28
345/55
2001/0022572 A1    9/2001 Murade
(Continued)

FOREIGN PATENT DOCUMENTS

CN    102779478 A    11/2012
CN    104392686 A    3/2015
(Continued)

OTHER PUBLICATIONS

Ex Parte Quayle Action dated Jan. 8, 2025, issued in U.S. Appl. No. 18/288,412 (16 pages).
(Continued)

*Primary Examiner* — William Boddie
*Assistant Examiner* — Saifeldin E Elnafia
(74) *Attorney, Agent, or Firm* — WHDA, LLP

(57) ABSTRACT

A driving circuit includes a driving signal generation circuit, a gating circuit, an output control circuit, a voltage control
(Continued)

circuit and an output circuit; the driving signal generation circuit generates the Nth stage of driving signal; the gating circuit writes a gating input signal into the first node under the control of a gating control signal; the output control circuit connects the first control node and the second node under the control of a potential of the first node; the voltage control circuit controls a potential of the second node according to the potential of the first node; the output circuit connects the output driving terminal and the first voltage terminal under the control of the potential of the second node, and connects the output driving terminal and the second voltage terminal under the control of the potential of the second control node; N is a positive integer.

19 Claims, 18 Drawing Sheets

(51) Int. Cl.
  *G09G 3/3258* (2016.01)
  *G11C 19/28* (2006.01)
(52) U.S. Cl.
  CPC ........... *G09G 2300/0819* (2013.01); *G09G 2300/0842* (2013.01); *G09G 2310/04* (2013.01); *G09G 2310/08* (2013.01); *G09G 2330/021* (2013.01); *G11C 19/28* (2013.01)
(58) Field of Classification Search
  CPC ........... G09G 2310/04; G09G 2310/08; G09G 2330/021; G09G 3/3258; G11C 19/28
  See application file for complete search history.

(56) References Cited

U.S. PATENT DOCUMENTS

| | | | |
|---|---|---|---|
| 2004/0021650 | A1 | 2/2004 | Yamashita et al. |
| 2011/0205196 | A1 | 8/2011 | Okuno et al. |
| 2014/0093028 | A1* | 4/2014 | Wu .................. G11C 19/28 377/64 |
| 2014/0253418 | A1 | 9/2014 | Pyun et al. |
| 2015/0034950 | A1 | 2/2015 | Miyazawa et al. |
| 2016/0148556 | A1 | 5/2016 | Tseng et al. |
| 2016/0351112 | A1 | 12/2016 | Qing et al. |
| 2018/0090090 | A1 | 3/2018 | Feng et al. |
| 2018/0211716 | A1* | 7/2018 | Ma .................. G11C 19/28 |
| 2018/0350315 | A1* | 12/2018 | Zhang .................. G09G 3/3677 |
| 2019/0057638 | A1 | 2/2019 | Kim et al. |
| 2019/0058029 | A1 | 2/2019 | Woo et al. |
| 2019/0180834 | A1 | 6/2019 | Yuan et al. |
| 2019/0304375 | A1 | 10/2019 | Kim et al. |
| 2019/0392916 | A1 | 12/2019 | Gu et al. |
| 2020/0184898 | A1 | 6/2020 | Choi et al. |
| 2020/0251044 | A1 | 8/2020 | Lin et al. |
| 2020/0342811 | A1 | 10/2020 | Xuan et al. |
| 2021/0193040 | A1 | 6/2021 | Na |
| 2022/0284861 | A1 | 9/2022 | Yang et al. |
| 2022/0343841 | A1 | 10/2022 | Shang et al. |
| 2023/0057970 | A1 | 2/2023 | Yamamoto |
| 2023/0207031 | A1 | 6/2023 | Wang et al. |
| 2023/0252933 | A1 | 8/2023 | Guo et al. |
| 2023/0282170 | A1 | 9/2023 | Shang et al. |

FOREIGN PATENT DOCUMENTS

| | | |
|---|---|---|
| CN | 106157923 A | 11/2016 |
| CN | 106971692 A | 7/2017 |
| CN | 106991973 A | 7/2017 |
| CN | 107393473 A | 11/2017 |
| CN | 107784977 A | 3/2018 |
| CN | 108597437 A | 9/2018 |
| CN | 108694894 A | 10/2018 |
| CN | 109427293 A | 3/2019 |
| CN | 109830256 A | 5/2019 |
| CN | 110322834 A | 10/2019 |
| CN | 111508433 A | 8/2020 |
| CN | 111933083 A | 11/2020 |
| CN | 111933084 A | 11/2020 |
| CN | 112687230 A | 4/2021 |
| CN | 112927644 A | 6/2021 |
| CN | 112992246 A | 6/2021 |
| CN | 113178161 A | 7/2021 |
| CN | 113178221 A | 7/2021 |
| CN | 113192551 A | 7/2021 |
| CN | 113421528 A | 9/2021 |
| CN | 113689824 A | 11/2021 |
| CN | 113689825 A | 11/2021 |
| CN | 113793570 A | 12/2021 |
| CN | 113870786 A | 12/2021 |
| CN | 114222615 A | 3/2022 |
| CN | 114495784 A | 5/2022 |
| CN | 114974067 A | 8/2022 |
| CN | 111798788 B | 9/2022 |
| CN | 217606538 U | 10/2022 |
| CN | 115376441 A | 11/2022 |
| CN | 115482780 A | 12/2022 |
| CN | 116778868 A | 9/2023 |
| CN | 117059033 A | 11/2023 |
| JP | 2013-213912 A | 10/2013 |
| JP | 2022-000833 A | 1/2022 |
| KR | 20170079775 A | 7/2017 |
| KR | 20180014365 A | 2/2018 |
| WO | 2021/161505 A1 | 8/2021 |
| WO | 2022/252092 A1 | 12/2022 |
| WO | 2023/213175 A1 | 11/2023 |

OTHER PUBLICATIONS

Ex Parte Quayle Action dated Feb. 13, 2025, issued in U.S. Appl. No. 18/558,383 (20 pages).

International Search Report dated Sep. 18, 2024, issued in Application No. PCT/CN2024/101236, with English translation. (24 pages).

* cited by examiner

DRIVING CIRCUIT, DRIVING METHOD, DRIVING MODULE AND DISPLAY DEVICE

CROSS-REFERENCE TO RELATED APPLICATION

The present disclosure is the U.S. national phase of PCT Application No. PCT/CN2022/140046 filed on Dec. 19, 2022, which are incorporated herein by reference in their entireties.

TECHNICAL FIELD

The present disclosure relates to the field of display technology, in particular to a driving circuit, a driving method, a driving module and a display device.

BACKGROUND

In the related art, when an Organic Light Emitting Diode (OLED) display updates an image, it is necessary to initialize and write pixel voltages to all rows of pixel circuits within one frame. And in some special images, such as the Always On Display (AOD) images, the AOD image is an image that controls the partial lighting of the screen without lighting up the entire mobile phone screen, a static image or a less updated image, most of the pixel circuits in the whole screen do not need to update the pixel voltage, that is, most of the pixel circuits can maintain the original display brightness through low-leakage low temperature polycrystalline oxide (LTPO) thin film transistor (TFT), and repeated flashing on these pixel circuits causes waste of power consumption.

SUMMARY

In one aspect, the present disclosure provides in some embodiments 1. A driving circuit, comprising a driving signal generation circuit, a gating circuit, an output control circuit, a voltage control circuit and an output circuit; wherein the driving signal generation circuit is configured to generate and output an Nth stage of driving signal through an Nth stage of driving signal output terminal under the control of a potential of a first control node and a potential of a second control node; the gating circuit is electrically connected to a first node, a gating input terminal and a gating control terminal, and is configured to control to write a gating input signal provided by the gating input terminal into the first node under the control of a gating control signal provided by the gating control terminal; the output control circuit is electrically connected to the first node, a first control node and a second node respectively, and is configured to control to connect the first control node and the second node under the control of a potential of the first node; the voltage control circuit is electrically connected to the first node and the second node respectively, and is configured to control a potential of the second node according to the potential of the first node; the output circuit is electrically connected to the second node, the second control node, a first voltage terminal, a second voltage terminal and an output driving terminal respectively, is configured to control to connect the output driving terminal and the first voltage terminal under the control of the potential of the second node, and control to connect the output driving terminal and the second voltage terminal under the control of the potential of the second control node; N is a positive integer.

Optionally, the gating circuit is configured to control to write the gating input signal provided by the gating input terminal into the first node when a potential of an (N−1)th stage of third node is a second voltage and the potential of the Nth stage of driving signal is the second voltage.

Optionally, the gating circuit includes a first transistor; a gate electrode of the first transistor is electrically connected to the gating control terminal, and a first electrode of the first transistor is electrically connected to the first node, a second electrode of the first transistor is electrically connected to the gating input terminal.

Optionally, the gating control terminal includes a first gating control terminal and a second gating control terminal; the gating circuit includes a first transistor and a second transistor; a gate electrode of the first transistor is electrically connected to a first gating control terminal, a first electrode of the first transistor is electrically connected to the first node, and a second electrode of the first transistor is electrically connected to a first electrode of the second transistor; a gate electrode of the second transistor is electrically connected to a second gating control terminal, and a second electrode of the second transistor is electrically connected to the gating input terminal; the first gating control terminal is an Nth stage of driving signal output terminal, the second gating control terminal is an (N−1)th stage of third node, and both the first transistor and the second transistor are p-type transistors; or, the first gating control terminal is the (N−1)th stage of third node, the second gating control terminal is the Nth stage of driving signal output terminal, and the first transistor and the second transistor are p-type transistors; or, the first gating control terminal is the (N−1)th stage of driving signal output terminal, the second gating control terminal is the Nth stage of driving signal output terminal, the first transistor is an n-type transistor, and the second transistor is a p-type transistor; or, the first gating control terminal is the Nth stage of driving signal output terminal, the second gating control terminal is the (N−1)th stage of driving signal output terminal, the first transistor is a p-type transistor, and the second transistor is an n-type transistor; or, the first gating control terminal is connected to an inversion signal of the (N−1)th stage of driving signal, the second gating control terminal is the Nth stage of driving signal output terminal, the first transistor and the second transistor are both p-type transistors; or, the first gating control terminal is the Nth stage of driving signal output terminal, and the second gating control terminal is connected to the inversion signal of the (N−1)th stage of driving signal; the first transistor and the second transistor are both p-type transistors; or, the first gating control terminal is the (N−1)th stage of driving signal terminal, the second gating control terminal is connected to the inversion signal of the Nth stage of driving signal, and the first transistor and the second transistor are both n-type transistors; or, the first gating control terminal is connected to the inversion signal of the Nth stage of driving signal, the second gating control terminal is the (N−1)th stage of driving signal terminal, and the first transistor and the second transistor are both n-type transistors.

Optionally, the output control circuit comprises a third transistor; a gate electrode of the third transistor is electrically connected to the first node, a first electrode of the third transistor is electrically connected to the first control node, and a second electrode of the third transistor is electrically connected to the second node; the voltage control circuit includes a first capacitor; a first terminal of the first capacitor is electrically connected to the first node, and a second terminal of the first capacitor is electrically connected to the second node.

Optionally, the output circuit comprises a fourth transistor, a fifth transistor and a second capacitor; a gate electrode of the fourth transistor is electrically connected to the second node, a first electrode of the fourth transistor is electrically connected to the first voltage terminal, and a second electrode of the fourth transistor is electrically connected to the output driving terminal; a first terminal of the second capacitor is electrically connected to the second node, and a second terminal of the second capacitor is electrically connected to the first voltage terminal; a gate electrode of the fifth transistor is electrically connected to the second control node, a first electrode of the fifth transistor is electrically connected to the output driving terminal, and a second electrode of the fifth transistor is electrically connected to the second voltage terminal.

Optionally, the driving circuit further includes an initialization circuit; wherein the initialization circuit is electrically connected to an initial control terminal, the first node and the second voltage terminal, and is configured to control to connect the first node and the second voltage terminal under the control of an initial control signal provided by the initial control terminal.

Optionally, the driving circuit further includes a first node control circuit; wherein the first node control circuit is electrically connected to a fourth node, the first node and the second voltage terminal, and is configured to control to connect the first node and the second voltage terminal under the control of a potential of the fourth node.

Optionally, the initialization circuit comprises a sixth transistor; a gate electrode of the sixth transistor is electrically connected to the initial control terminal, a first electrode of the sixth transistor is electrically connected to the first node, and a second electrode of the sixth transistor is electrically connected to the second voltage terminal.

Optionally, the first node control circuit comprises a seventh transistor; a gate electrode of the seventh transistor is electrically connected to the fourth node, a first electrode of the seventh transistor is electrically connected to the first node, and a second electrode of the seventh transistor is electrically connected to the second voltage terminal.

Optionally, the driving signal generation circuit comprises a first control node control circuit, a second control node control circuit, a first driving output circuit, and a second driving output circuit; the first control node control circuit is configured to control the potential of the first control node; the second control node control circuit is configured to control the potential of the second control node; the first driving output circuit is electrically connected to the first control node, the first voltage terminal and the Nth stage of driving signal output terminal respectively, and is configured to control to connect the Nth stage of driving signal output terminal and the first voltage terminal under the control of the potential of the first control node; the second driving output circuit is electrically connected to the second control node, the Nth stage of driving signal output terminal and the second voltage terminal, and is configured to control to connect the Nth stage of driving signal output terminal and the second voltage terminal under the control of the potential of the second control node.

Optionally, the first control node control circuit comprises a fifth node control circuit, a sixth node control circuit, a third node control circuit, and a first control circuit; the fifth node control circuit is respectively electrically connected to a first clock signal terminal, the second voltage terminal, a fifth node and a seventh node, and is configured to control to connect the fifth node and the second voltage terminal under the control of a first clock signal provided by the first clock signal terminal, and control to connect the fifth node and the first clock signal terminal under the control of a potential of the seventh node; the sixth node control circuit is electrically connected to the second voltage terminal, a fifth node and a sixth node, and is configured to control to connect the fifth node and the sixth node under the control of the second voltage signal provided by the second voltage terminal; the third node control circuit is electrically connected to the sixth node, a second clock signal terminal and a third node, and is configured to control to connect the second clock signal terminal and the third node under the control of a potential of the sixth node, and control a potential of the third node according to the potential of the sixth node; the first control circuit is electrically connected to the second clock signal terminal, the third node, the first control node, the first voltage terminal and the seventh node, respectively, is configured to control to connect the third node and the first control node under the control of the second clock signal provided by the second clock signal terminal, and control to connect the first control node and the first voltage terminal under the control of the potential of the seventh node.

Optionally, the second control node control circuit comprises a fourth node control circuit, a seventh node control circuit, an eighth node control circuit, and a second control circuit; the fourth node control circuit is respectively electrically connected to a fourth node, a fifth node, the first voltage terminal, an eighth node and the second clock signal terminal, and is configured to control to connect the fourth node and the first voltage terminal under the control of a potential of the fifth node, and control to connect the fourth node and the second clock signal terminal under the control of a potential of the eighth node; the seventh node control circuit is electrically connected to a seventh node, the (N−1)th stage of driving signal output terminal, the first clock signal terminal, an initial control terminal and the first voltage terminal, and is configured to control to connect the seventh node and the (N−1)th stage of driving signal output terminal under the control of a first clock signal provided by the first clock signal terminal, and control to connect the seventh node and the first voltage terminal under the control of an initial control signal provided by the initial control terminal; the eighth node control circuit is electrically connected to an eighth node, the first clock signal terminal, the second voltage terminal, the (N−1)th stage of driving signal output terminal, a ninth node, and a fourth node, is configured to control to connect the ninth node and the (N−1)th stage of driving signal output terminal under the control of the first clock signal, and control to connect the ninth node and the eighth node under the control of the second voltage signal provided by the second voltage terminal, and control a potential of the eighth node according to a potential of the fourth node; the second control circuit is electrically connected to a seventh node, the second voltage terminal, the second control node and the eighth node, and is configured to control to connect the second control node and the seventh node under the control of the second voltage signal provided by the second voltage terminal, and control to connect the second control node and the eighth node under the control of the potential of the eighth node.

Optionally, the fifth node control circuit includes an eighth transistor and a ninth transistor; a gate electrode of the eighth transistor is electrically connected to the first clock signal terminal, a first electrode of the eighth transistor is electrically connected to the second voltage terminal, and a second electrode of the eighth transistor is electrically connected to the fifth node; a gate electrode of the ninth transistor is electrically connected to the seventh node, a first electrode of the ninth transistor is electrically connected to the fifth node, and a second electrode of the ninth transistor is electrically connected to the first clock signal terminal; the sixth node control circuit includes a tenth transistor; a gate electrode of the tenth transistor is electrically connected to the second voltage terminal, a first electrode of the tenth transistor is electrically connected to the fifth node, and a second electrode of the tenth transistor is electrically connected to the sixth node; the third node control circuit includes an eleventh transistor and a third capacitor; a gate electrode of the eleventh transistor is electrically connected to the sixth node, a first electrode of the eleventh transistor is electrically connected to the second clock signal terminal, and a second electrode of the eleventh transistor is electrically connected to the third node; a first terminal of the third capacitor is electrically connected to the sixth node, and a second terminal of the third capacitor is electrically connected to the third node; the first control circuit includes a twelfth transistor and a thirteenth transistor; a gate electrode of the twelfth transistor is electrically connected to the seventh node, a first electrode of the twelfth transistor is electrically connected to the first control node, and a second electrode of the twelfth transistor is electrically connected to the first voltage terminal; a gate electrode of the thirteenth transistor is electrically connected to the second clock signal terminal, a first electrode of the thirteenth transistor is electrically connected to the third node, and a second electrode of the thirteenth transistor is electrically connected to the first control node.

Optionally, the fourth node control circuit comprises a fourteenth transistor and a fifteenth transistor; a gate electrode of the fourteenth transistor is electrically connected to the fifth node, a first electrode of the fourteenth transistor is electrically connected to the first voltage terminal, and a second electrode of the fourteenth transistor is electrically connected to the fourth node; a gate electrode of the fifteenth transistor is electrically connected to the eighth node, a first electrode of the fifteenth transistor is electrically connected to the fourth node, and a second electrode of the fifteenth transistor is electrically connected to the second clock signal terminal; the seventh node control circuit includes a sixteenth transistor and a seventeenth transistor; a gate electrode of the sixteenth transistor is electrically connected to the first clock signal terminal, a first electrode of the sixteenth transistor is electrically connected to the (N−1)th stage of driving signal output terminal, and a second electrode of the sixteenth transistor is electrically connected to the seventh node; a gate electrode of the seventeenth transistor is electrically connected to the initial control terminal, a first electrode of the seventeenth transistor is electrically connected to the first voltage terminal, and a second electrode of the seventeenth transistor is electrically connected to the seventh node; the eighth node control circuit includes an eighteenth transistor, a nineteenth transistor, and a fourth capacitor; a gate electrode of the eighteenth transistor is electrically connected to the first clock signal terminal, a first electrode of the eighteenth transistor is electrically connected to the (N−1)th stage of driving signal output terminal, and a second electrode of the eighteenth transistor is electrically connected to a ninth node; a gate electrode of the nineteenth transistor is electrically connected to the second voltage terminal, a first electrode of the nineteenth transistor is electrically connected to the ninth node, and a second electrode of the nineteenth transistor is electrically connected to the eighth node; a first terminal of the fourth capacitor is electrically connected to the fourth node, and a second terminal of the fourth capacitor is electrically connected to the eighth node; the second control circuit includes a twentieth transistor and a twenty-first transistor; a gate electrode of the twentieth transistor is electrically connected to the second voltage terminal, a first electrode of the twentieth transistor is electrically connected to the seventh node, and a second electrode of the twentieth transistor is electrically connected to the second control node; a gate electrode of the twenty-first transistor is electrically connected to the eighth node, a first electrode of the twenty-first transistor is electrically connected to the second control node, and a second electrode of the twenty-first transistor is electrically connected to the eighth node.

Optionally, the first driving output circuit includes a twenty-second transistor and a fifth capacitor, and the second driving output circuit includes a twenty-third transistor and a sixth capacitor; a gate electrode of the twenty-second transistor is electrically connected to the first control node, a first electrode of the twenty-second transistor is electrically connected to the first voltage terminal, and a second electrode of the twenty-second transistor is electrically connected to the Nth stage of driving signal output terminal; a first terminal of the fifth capacitor is electrically connected to the first control node, and a second terminal of the fifth capacitor is electrically connected to the first voltage terminal; a gate electrode of the twenty-third transistor is electrically connected to the second control node, a first electrode of the twenty-third transistor is electrically connected to the Nth stage of driving signal output terminal, and a second electrode of the twenty-third transistor is electrically connected to the second voltage terminal; a first terminal of the sixth capacitor is electrically connected to the Nth stage driving signal output terminal, and a second terminal of the sixth capacitor is electrically connected to the second voltage terminal.

In a second aspect, an embodiment of the present disclosure provides a driving method applied to the driving circuit, includes: generating and outputting, by the driving signal generation circuit, the Nth stage of driving signal through the Nth stage of driving signal output terminal under the control of the potential of the first control node and the potential of the second control node; controlling, by the gating circuit, to write the gating input signal provided by the gating input terminal into the first node under the control of the gating control signal; controlling, by the output control circuit, to connect the first control node and the second node under the control of the potential of the first node; controlling, by the voltage control circuit, the potential of the second node according to the potential of the first node; controlling, by the output circuit, to connect the output driving terminal and the first voltage terminal under the control of the potential of the second node, and to connect the output driving terminal and the second voltage terminal under the control of the potential of the second control node.

In a third aspect, an embodiment of the present disclosure provides a driving module, including a plurality of stages of driving circuit; wherein an Nth stage of driving circuit is electrically connected to a driving signal output terminal included in an (N−1)th stage of driving circuit; N is a positive integer.

In a fourth aspect, an embodiment of the present disclosure provides a display device including the driving module.

DETAILED DESCRIPTION

The following will clearly and completely describe the technical solutions in the embodiments of the present disclosure with reference to the accompanying drawings. Obviously, the described embodiments are only some of the embodiments of the present disclosure, not all of them. Based on the embodiments in the present disclosure, all other embodiments obtained by those ordinary skill in the art without making creative work belong to the protection scope of the present disclosure.

The transistors used in all the embodiments of the present disclosure may be thin film transistors or field effect transistors or other devices with the same characteristics. In the embodiments of the present disclosure, in order to distinguish the two electrodes of the transistor except the gate electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, and the second electrode may be a drain electrode.

Figure 1:
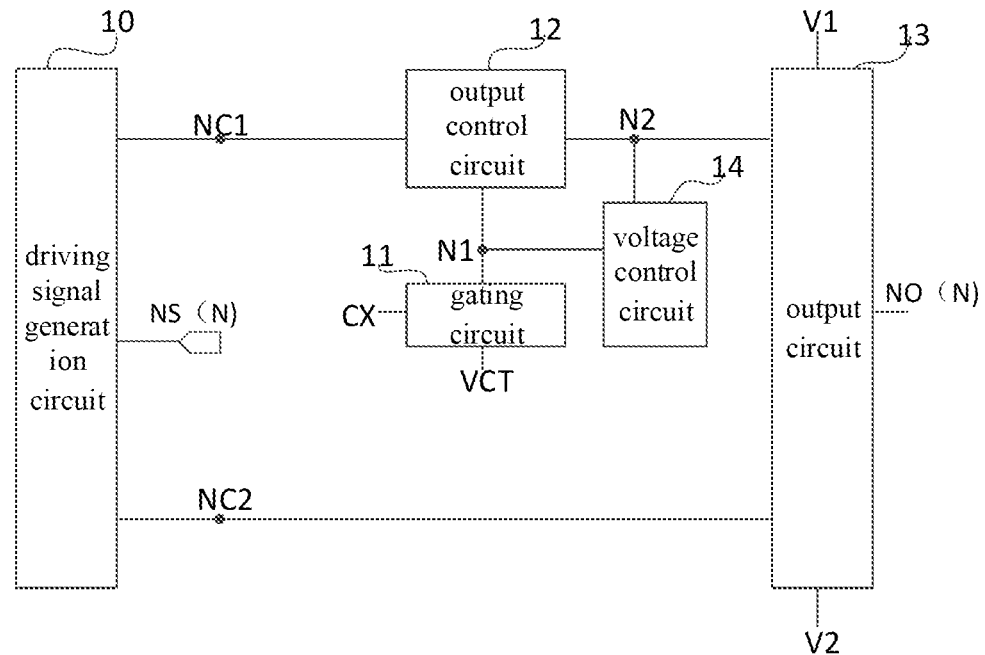
FIG. 1 is a structural diagram of a driving circuit according to an embodiment of the present disclosure.

As shown in FIG. 1, the driving circuit in the embodiment of the present disclosure includes a driving signal generation circuit 10, a gating circuit 11, an output control circuit 12, an output circuit 13 and a voltage control circuit 14;

The driving signal generation circuit 10 is electrically connected to a first control node NC1, a second control node NC2 and an Nth stage of driving signal output terminal NS(N), is configured to generate and output an Nth stage of driving signal through the Nth stage of driving signal output terminal NS(N) under the control of a potential of the first control node NC1 and a potential of the second control node NC2;

The gating circuit 11 is electrically connected to the first node N1, a gating input terminal VCT and a gating control terminal CX, and is configured to control to write a gating input signal provided by the gating input terminal VCT into the first node N1 under the control of a gating control signal provided by the gating control terminal CX;

The output control circuit 12 is electrically connected to the first node N1, a first control node NC1 and a second node N2 respectively, and is configured to control to connect the first control node NC1 and the second node N2 under the control of the potential of the first node N1;

The voltage control circuit 14 is electrically connected to the first node N1 and the second node N2 respectively, and is configured to control a potential of the second node N2 according to a potential of the first node N1;

The output circuit 13 is electrically connected to the second node N2, a second control node NC2, a first voltage terminal V1, a second voltage terminal V2 and an output driving terminal NO(N) respectively, is configured to control to connect the output driving terminal NO(N) and the first voltage terminal V1 under the control of the potential of the second node N2, and control to connect the output driving terminal NO and the second voltage terminal V2 under the control of the potential of the second control node NC2 (N);

N is a positive integer.

When the driving circuit shown in FIG. 1 of an embodiment of the present disclosure is in operation, the driving signal generation circuit 10 generates and outputs the Nth stage of driving signal through the Nth stage of driving signal output terminal NS(N), and the gating circuit 11 writes the gating input signal into the first node N1 under the control of thein the gating control signal; the output control circuit 12 controls to connect the first control node NC1 and the second node N2 under the control of the potential of the first node N1; the voltage control circuit 14 controls the potential of the second node N2 according to the potential of the first node N1; the output circuit 13 controls to connect the output driving terminal NO(N) and the first voltage terminal V1 under the control of the potential of the second node N2, and controls to connect the output driving terminal NO(N) and the second voltage terminal V2 under the control of the potential of the second control node NC2.

Optionally, the first voltage terminal may be a high voltage terminal, but not limited thereto.

The driving circuit shown in FIG. 1 may be an Nth stage of driving circuit.

When the driving circuit shown in FIG. 1 is working, within one frame,

Before a supply phase of the Nth stage of driving signal, the gating circuit 11 writes the gating input signal provided by the gating input terminal VCT into the first node N1 under the control of the gating control signal;

When the gating input signal is a high voltage signal, in the Nth stage of driving signal supply stage, the Nth stage of driving signal output terminal NS(N) outputs a high voltage signal, the potential of the first node N1 is a high voltage, and the output control circuit 12 controls to disconnect the first control node NC1 and the second node N2 under the control of the potential of the first node N1, and the voltage control circuit 14 controls the potential of the second node N2 to be a high voltage according to the potential of the first node N1, and the output circuit controls the output driving terminal NO (N) to maintain to output a low voltage signal, which can control the corresponding row of pixel circuits not to update the pixel voltage;

When the gating input signal is a low voltage signal, in the supply phase of the Nth stage of driving signal, the Nth stage of driving signal output terminal NS(N) outputs a high voltage signal, and the potential of the first node N1 is a low voltage, and the output control circuit 12 controls to connect the first control node NC1 and the second node N2 under the control of the potential of the first node N1, so that the potential of the second node N2 is a low voltage, and the output circuit 13 controls to connect the output driving terminal NO(N) and the first voltage terminal V1 under the control of the potential of the second node N2, so that NO(N) outputs a high voltage signal, and can control the corresponding row of pixel circuits to update the pixel voltages.

In the embodiment of the present disclosure, by controlling the gating input signal provided by the gating input terminal VCT, the update of the partial screen of the display screen can be realized, thereby reducing power consumption, or by partially updating the display screen, the ultra-low power consumption of wearable products, mobile terminals, notebook and other OLED display products may be realized.

Figure 2:
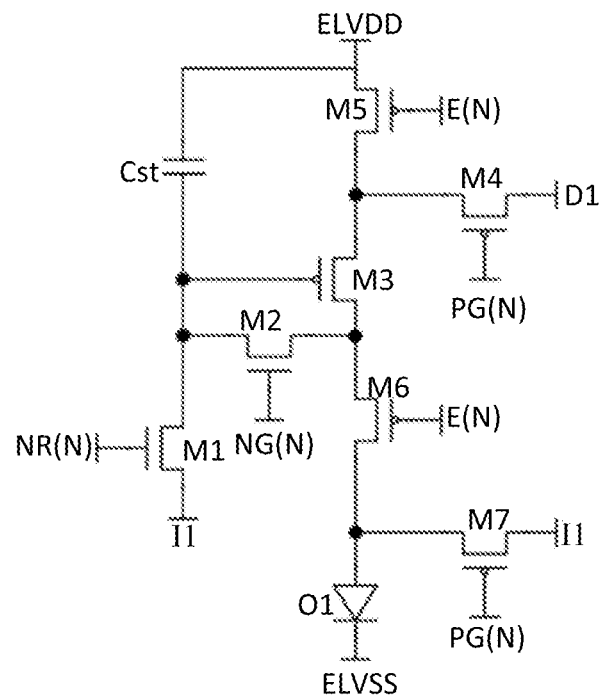
FIG. 2 is a circuit diagram of a related pixel circuit.

As shown in FIG. 2, the relevant pixel circuit may include a first display control transistor M1, a second display control transistor M2, a driving transistor M3, a 2fourth display control transistor M4, a fifth display control transistor M5, a sixth display control transistor M6, a seventh display control transistor M7, a storage capacitor Cst and an organic light emitting diode O1;

The gate electrode of M1 is electrically connected to the first reset terminal NR (N), the source electrode of M1 is electrically connected to the initial voltage terminal I1, and the drain electrode of M1 is electrically connected to the gate electrode of M3;

The gate electrode of M2 is electrically connected to the first scanning terminal NG (N), the source electrode of M2 is electrically connected to the gate electrode of M3, and the drain electrode of M2 is electrically connected to the drain electrode of M3;

The gate electrode of M4 is electrically connected to the second scanning terminal PG (N), the source electrode of M4 is electrically connected to the data line D1, and the drain electrode of M4 is electrically connected to the source electrode of M3;

The gate electrode of M5 is electrically connected to the light emitting control terminal E(N), the source electrode of M5 is electrically connected to the power supply voltage terminal ELVDD, and the drain electrode of M5 is electrically connected to the source electrode of M3;

The gate electrode of M6 is electrically connected to the light emitting control terminal E(N), the source electrode of M6 is electrically connected to the drain electrode of M3, the drain electrode of M6 is electrically connected to the anode of O1; the cathode of O1 is electrically connected to the terminal ELVSS;

The gate electrode of M7 is electrically connected to the second scanning terminal PG (N), the source electrode of M7 is electrically connected to the initial voltage terminal I1, and the drain electrode of M7 is electrically connected to the anode of O1.

During specific implementation, the first reset terminal NR(N) may be of the (N−1)th stage of the first scanning terminal NG(N), but not limited thereto.

In the related pixel circuit shown in FIG. 2, M1 and M2 are n-type transistors, M3, M4, M5, M6 and M7 are all p-type transistors, M1 and M2 are IGZO TFTs with small leakage current, M3 and M4, M5, M6 and M7 are all LTPS TFTs.

In the related pixel circuit shown in FIG. 2, M1 and M2 are IGZO TFTs. When low-frequency display is used, the IGZO TFT can ensure that Cst can maintain the gate voltage of M3 for a long time.

In the related pixel circuit shown in FIG. 2, the second scanning terminal PG (N) is responsible for resetting the voltage of the anode of O1 and writing the data voltage on the data line into the source electrode of the driving transistor, and the first scanning terminal NG (N) is responsible for realizing the reset of Cst, extracting Vth (Vth is the threshold voltage of the driving transistor) and writing the data voltage into the gate electrode of the driving transistor.

During specific implementation, the first scanning signal provided by the first scanning terminal NG(N) and the second scanning signal provided by the second scanning terminal PG(N) may be opposite in phase, but not limited thereto.

The driving circuit described in at least one embodiment of the present disclosure can provide the first scanning terminal NG(N) with the first scanning signal through the output driving terminal NO(N), but is not limited thereto.

Figure 3:
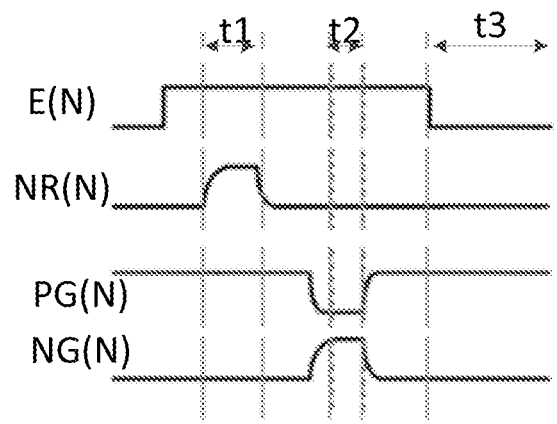
FIG. 3 is a working timing diagram of the related pixel circuit shown in FIG. 2.

As shown in FIG. 3, when the relevant pixel circuit shown in FIG. 2 is in operation, the display period may include a first display control phase t1, a second display control phase t2 and a third display control phase t3 which are set successively;

In the first display control phase t1, E(N) outputs a high voltage signal, NR(N) provides a high voltage signal, PG(N) provides a high voltage signal, NG(N) provides a low voltage signal, M5 and M6 are turned off, M1 is turned on, and the potential of the gate electrode of M3 is pulled down to an initial voltage Vinit; the initial voltage terminal I1 is configured to provide the initial voltage Vinit;

In the second display control phase t2, E(N) outputs a high voltage signal, NR(N) provides a low voltage signal.

PG(N) provides a low voltage signal. NG(N) provides a high voltage signal, M5 and M6 are turned off, M1 is turned off M2 is turned on, M4 is turned on. M2 and M3 form a diode structure, and the data voltage Vdata provided by the data line D1 charges Cst until M3 is turned off. At this time, the gate voltage of M3 is Vdata+Vth, and Vth is the threshold voltage of M3; M7 is turned on to reset the anode voltage of O1;

In the third display control phase t3, E(N) outputs a low voltage signal. NR(N) provides a low voltage signal, PG(N) provides a high voltage signal, NG(N) provides a low voltage signal, M5 and M6 are turned on, M3 drives O1 to emit light; O1 emits light according to the voltage setting of Vdata.

It can be seen from the working process of the related pixel circuit above that NG (N) can control whether the data voltage Vdata (the data voltage Vdata can be the pixel voltage) is written into the gate electrode of M3 in the second display control phase.

Figure 4:
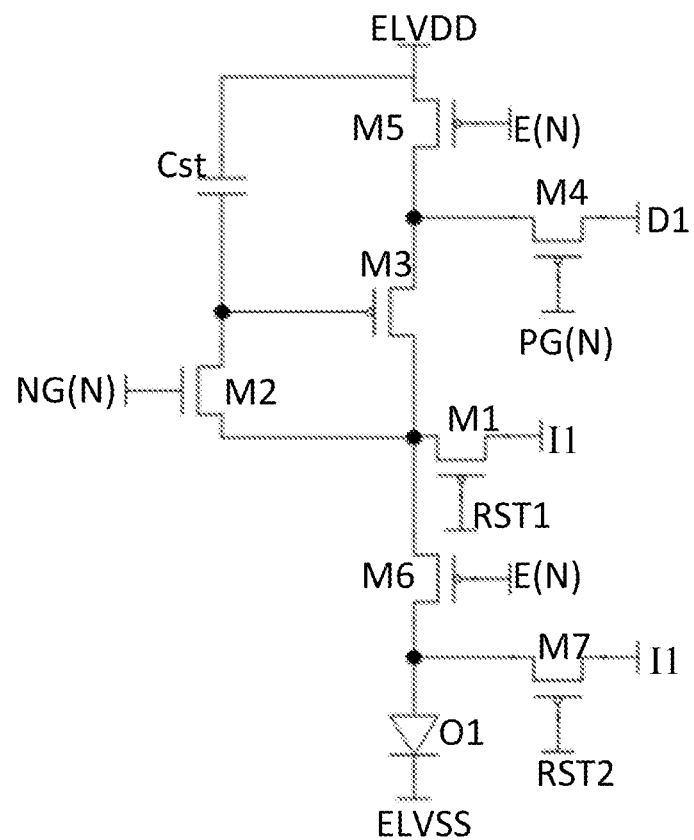
FIG. 4 is a circuit diagram of a related pixel circuit.

FIG. 4 is a circuit diagram of a related pixel circuit.

As shown in FIG. 4, the relevant pixel circuit may include a first display control transistor M1, a second display control transistor M2, a driving transistor M3, a fourth display control transistor M4, a fifth display control transistor M5, a sixth display control transistor M6, a seventh display control transistor M7, a storage capacitor Cst and an organic light emitting diode O1;

The gate electrode of M1 is electrically connected to the third reset terminal RST1, the source electrode of M1 is electrically connected to the initial voltage terminal I1, and the drain electrode of M1 is electrically connected to the drain electrode of M3;

The gate electrode of M2 is electrically connected to the first scanning terminal NG (N), the source electrode of M2 is electrically connected to the gate electrode of M3, and the drain electrode of M2 is electrically connected to the drain electrode of M3;

The gate electrode of M4 is electrically connected to the second scanning terminal PG (N), the source electrode of M4 is electrically connected to the data line D1, and the drain electrode of M4 is electrically connected to the source electrode of M3;

The gate electrode of M5 is electrically connected to the light emitting control terminal E(N), the source electrode of M5 is electrically connected to the power supply voltage terminal ELVDD, and the drain electrode of M5 is electrically connected to the source electrode of M3;

The gate electrode of M6 is electrically connected to the light emitting control terminal E(N), the source electrode of M6 is electrically connected to the drain electrode of M3, the drain electrode of M6 is electrically connected to the anode of O1; the cathode of O1 is electrically connected to the low level terminal ELVSS:

The gate electrode of M7 is electrically connected to the fourth reset terminal RST2, the source electrode of M7 is electrically connected to the initial voltage terminal I1, and the drain electrode of M7 is electrically connected to the anode of O1.

When the related pixel circuit shown in FIG. 4 is in operation, NG(N) can control whether the data voltage Vdata on the data line D1 is written into the gate electrode of the driving transistor M3.

In specific implementation, the first scanning signal provided by NG (N) can be configured to control to turn on or off the second transistor to control whether the data voltage on the data line is written into the gate electrode of the driving transistor, thereby controlling whether to update the brightness of the current row of pixel circuits, when NG (N) outputs a high voltage signal, the second transistor is turned on to update the brightness of the current row of pixel circuits; when NG (N) outputs a low voltage signal, the second transistor is always turned off, the change of the data voltage on the data line will not be written into the gate electrode of the driving transistor, and the brightness of the organic light emitting diode will not change, that is, the display brightness of the current row of pixel circuits remains unchanged in the current frame. To sum up, the pixel brightness can be refreshed by controlling the N-type transistor to be tinned on or off. Therefore, when some pixels are not to be refreshed, it is sufficient to ensure that the N-type transistor is turned off.

In at least one embodiment of the present disclosure, the gating circuit is configured to control to write the gating input signal provided by the gating input terminal into the first node when the potential of the (N−1)th stage of third node is the second voltage and the potential of the Nth stage of driving signal is the second voltage.

Optionally, the second voltage may be a low voltage, but not limited thereto.

Optionally, the gating circuit includes a first transistor; a gate electrode of the first transistor is electrically connected to the gating control terminal, and a first electrode of the first transistor is electrically connected to the first node, a second electrode of the first transistor is electrically connected to the gating input terminal.

Figure 5:
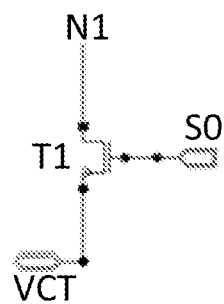
FIG. 5 is a circuit diagram of a gating circuit in a driving circuit according to an embodiment of the present disclosure.

As shown in FIG. 5, the gating circuit may include a first transistor T1;

The gate electrode of the first transistor T1 is electrically connected to the gating control terminal S0, the drain electrode of the first transistor T1 is electrically connected to the first node N1, and the source electrode of the first transistor T1 is electrically connected to the gating input terminal VCT;

T1 is a p-type transistor.

Figure 6:
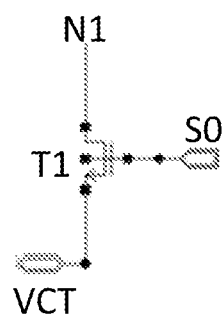
FIG. 6 is a circuit diagram of a gating circuit in a driving circuit according to an embodiment of the present disclosure.

As shown in FIG. 6, the gating circuit may include a first transistor T1;

The gate electrode of the first transistor T1 is electrically connected to the gating control terminal S0, the source electrode of the first transistor T1 is electrically connected to the first node N1, and the drain electrode of the first transistor T1 is electrically connected to the gating input terminal VCT:

T1 is an n-type transistor.

Optionally, the gating control terminal includes a first gating control terminal and a second gating control terminal; the gating circuit includes a first transistor and a second transistor:

A gate electrode of the first transistor is electrically connected to the first gating control terminal, a first electrode of the first transistor is electrically connected to the first node, and a second electrode of the first transistor is electrically connected to a first electrode of the second transistor;

A gate electrode of the second transistor is electrically connected to the second gating control terminal, and a second electrode of the second transistor is electrically connected to the gating input terminal;

The first gating control terminal is the Nth stage of driving signal output terminal, the second gating control terminal is the (N−1)th stage of third node, and both the first transistor and the second transistor are p-type transistor; or, The first gating control terminal is the (N−1)th stage of third node, the second gating control terminal is the Nth stage of driving signal output terminal, and the first transistor and the second transistor are p-type transistor; or, The first gating control terminal is the (N−1)th stage of driving signal output terminal, the second gating control terminal is the Nth stage of driving signal output terminal, the first transistor is an n-type transistor, and the second transistor is a p-type transistor; or, The first gating control terminal is the Nth stage of driving signal output terminal, the second gating control terminal is the (N−1)th stage of driving signal output terminal, the first transistor is a p-type transistor, and the second transistor is an n-type transistor; or, The first gating control terminal is connected to an inversion signal of the (N−1)th stage of driving signal, the second gating control terminal is the Nth stage of driving signal output terminal, the first transistor and the second transistor are both p-type transistors; or, The first gating control terminal is the Nth stage of driving signal output terminal, and the second gating control terminal is connected to the inversion signal of the (N−1)th stage of driving signal; the first transistor and the second transistor are both p-type transistors; or, The first gating control terminal is the (N−1)th stage of driving signal terminal, the second gating control terminal is connected to the inversion signal of the Nth stage of driving signal, and the first transistor and the second transistor are both n-type transistors; or, The first gating control terminal is connected to the inversion signal of the Nth stage of driving signal, the second gating control terminal is the (N−1)th stage of driving signal terminal, and the first transistor and the second transistor are both n-type transistors.

Figure 7:
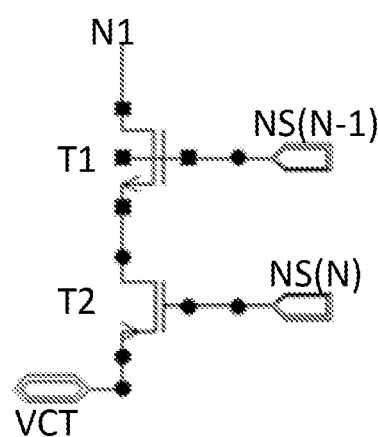
FIG. 7 is a circuit diagram of a gating circuit in a driving circuit according to an embodiment of the present disclosure.

As shown in FIG. 7, the gating circuit may include a first transistor T1 and a second transistor T2;

The gate electrode of the first transistor T1 is electrically connected to the (N−1)th stage of driving signal output terminal NS(N−1), the source electrode of the first transistor T1 is electrically connected to the first node N1, and the drain electrode of the first transistor T1 is electrically connected to the drain electrode of the second transistor T2;

The gate electrode of the second transistor T2 is electrically connected to the Nth stage of driving signal output terminal NS(N), and the source electrode of the second transistor T2 is electrically connected to the gating input terminal VCT;

T1 is an n-type transistor, and T2 is a p-type transistor.

Figure 8:
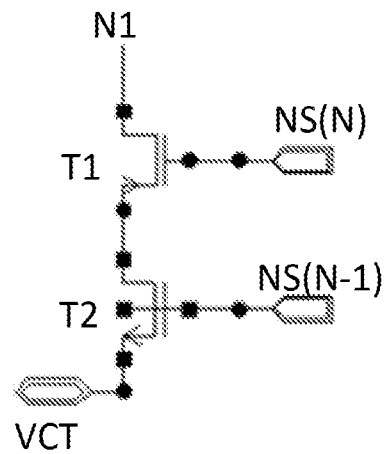
FIG. 8 is a circuit diagram of a gating circuit in a driving circuit according to an embodiment of the present disclosure.

As shown in FIG. 8, the gating circuit may include a first transistor T1 and a second transistor T2;

The gate electrode of the first transistor T1 is electrically connected to the Nth stage of driving signal output terminal NS(N), the drain electrode of the first transistor T1 is electrically connected to the first node N1, and the source electrode of the first transistor T1 is electrically connected to the source electrode of the second transistor T2;

The gate electrode of the second transistor T2 is electrically connected to the (N−1)th stage of driving signal output terminal NS(N−1), and the drain electrode of the second transistor T2 is electrically connected to the gating input terminal VCT;

T1 is a p-type transistor, and T2 is an n-type transistor.

Figure 9:
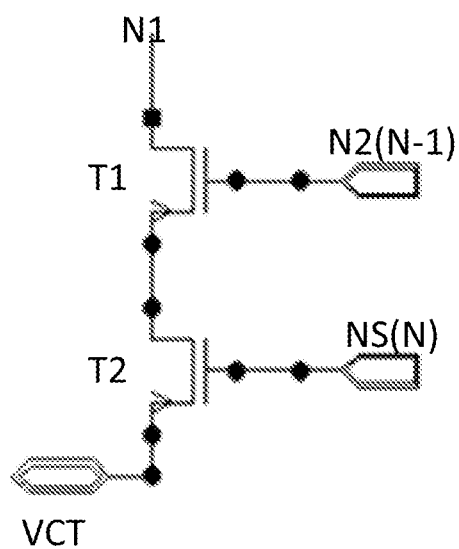
FIG. 9 is a circuit diagram of a gating circuit in a driving circuit according to an embodiment of the present disclosure.

As shown in FIG. 9, the gating circuit may include a first transistor T1 and a second transistor T2;

The gate electrode of the first transistor T1 is electrically connected to the (N−1)th stage of third node N3 (N−1), the drain electrode of the first transistor T1 is electrically connected to the first node N1, and the source electrode of the first transistor T1 is electrically connected to the drain electrode of the second transistor T2;

The gate electrode of the second transistor T2 is electrically connected to the Nth stage of driving signal output terminal NS(N), and the source electrode of the second transistor T2 is electrically connected to the gating input terminal VCT;

T1 is a p-type transistor, and T2 is a p-type transistor.

In at least one embodiment of the present disclosure, the (N−1)th stage of third node N3(N−1) may be a third node in the (N−1)th stage of driving circuit.

Figure 10:
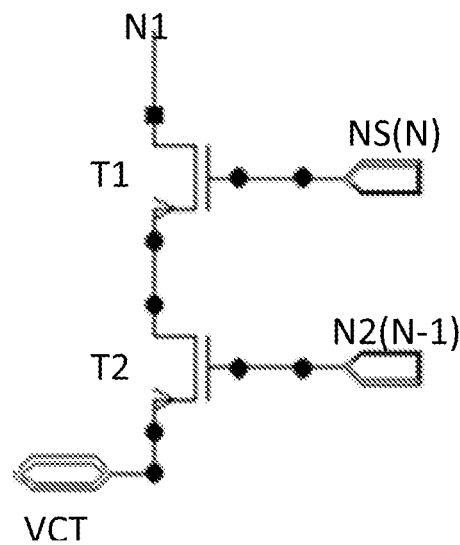
FIG. 10 is a circuit diagram of a gating circuit in a driving circuit according to an embodiment of the present disclosure.

As shown in FIG. 10, the gating circuit may include a first transistor T1 and a second transistor T2;

The gate electrode of the first transistor T1 is electrically connected to the Nth stage of driving signal output terminal NS(N), the drain electrode of the first transistor T1 is electrically connected to the first node N1, and the source electrode of the first transistor T1 is electrically connected to the drain electrode of the second transistor T2;

The gate electrode of the second transistor T2 is electrically connected to the (N−1)th stage of third node N3 (N−1), and the source electrode of the second transistor T2 is electrically connected to the gating input terminal VCT:

T1 is a p-type transistor, and T2 is a p-type transistor.

Figure 11:
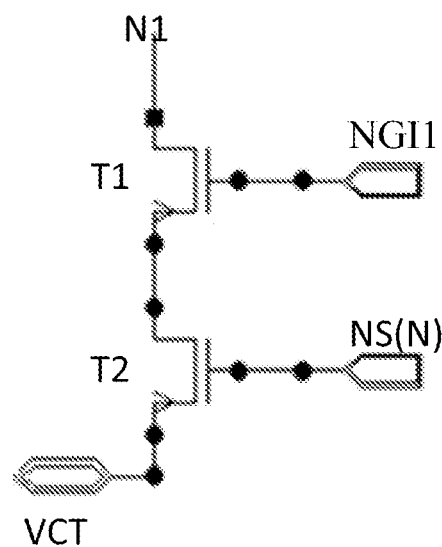
FIG. 11 is a circuit diagram of a gating circuit in a driving circuit according to an embodiment of the present disclosure.

As shown in FIG. 11, the gating circuit may include a first transistor T1 and a second transistor T2;

The gate electrode of the first transistor T1 is electrically connected to a first inverting driving signal terminal NGI1, the drain electrode of the first transistor T1 is electrically connected to the first node N1, and the source electrode of the first transistor T1 is electrically connected to the drain electrode of the second transistor T2; a first inverting driving signal provided by the first inverting driving signal terminal NGI1 and the (N−1)th stage of driving signal provided by the (N−1) the stage of driving signal output terminal NS (N−1) are opposite in phase;

The gate electrode of the second transistor T2 is electrically connected to the Nth stage of driving signal output terminal NS(N), and the source electrode of the second transistor T2 is electrically connected to the gating input terminal VCT;

T1 is a p-type transistor, and T2 is a p-type transistor.

Figure 12:
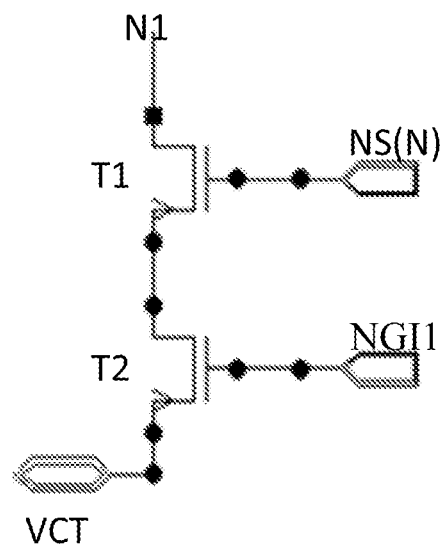
FIG. 12 is a circuit diagram of a gating circuit in a driving circuit according to an embodiment of the present disclosure.

As shown in FIG. 12, the gating circuit may include a first transistor T1 and a second transistor T2;

The gate electrode of the first transistor T1 is electrically connected to the Nth stage of driving signal output terminal NS(N), the drain electrode of the first transistor T1 is electrically connected to the first node N1, and the source electrode of the first transistor T1 is electrically connected to the drain electrode of the second transistor T2;

The gate electrode of the second transistor T2 is electrically connected to the first inverting driving signal terminal NGI1, and the source electrode of the second transistor T2 is electrically connected to the gating input terminal VCT; the first inverting driving signal provided by first inverting driving signal terminal NGI1 and the (N−1)th stage of driving signal provided by the (N−1)th stage of driving signal output terminal NS(N−1) are opposite in phase;

T1 is a p-type transistor, and T2 is a p-type transistor.

Figure 13:
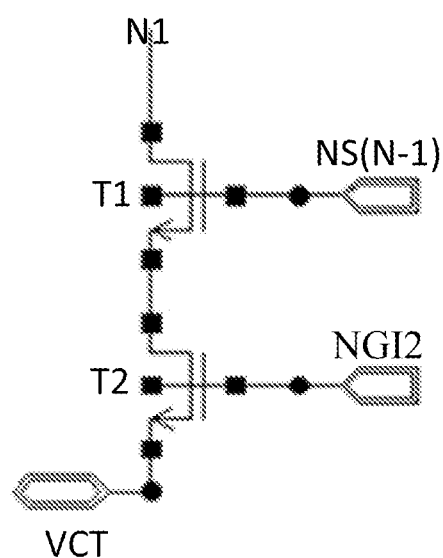
FIG. 13 is a circuit diagram of a gating circuit in a driving circuit according to an embodiment of the present disclosure.

As shown in FIG. 13, the gating circuit may include a first transistor T1 and a second transistor T2;

The gate electrode of the first transistor T1 is electrically connected to the (N−1)th stage driving signal output terminal NS(N−1), the source electrode of the first transistor T1 is electrically connected to the first node N1, and the drain electrode of the first transistor T1 is electrically connected to the source electrode of the second transistor T2;

The gate electrode of the second transistor T2 is electrically connected to a second inverting driving signal terminal NGI2, and the drain electrode of the second transistor T2 is electrically connected to the gating input terminal VCT; the second inverting driving signal provided by the second inverting driving signal terminal NGI2 and the Nth stage of driving signal provided by the Nth stage of driving signal output terminal NS(N) are opposite in phase;

T1 is an n-type transistor, and T2 is an n-type transistor.

Figure 14:
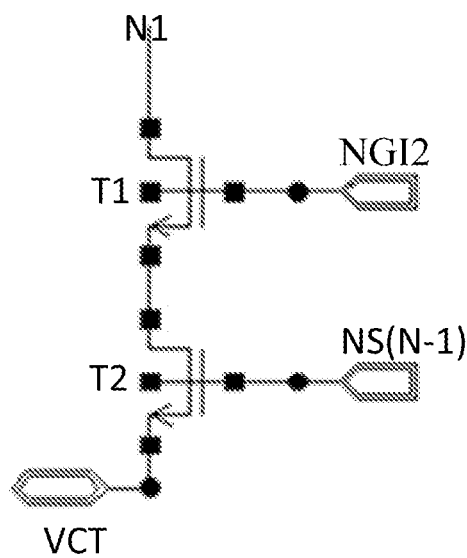
FIG. 14 is a circuit diagram of a gating circuit in a driving circuit according to an embodiment of the present disclosure.

As shown in FIG. 14, the gating circuit may include a first transistor T1 and a second transistor T2;

The gate electrode of the first transistor T1 is electrically connected to the second inverting driving signal terminal NGI2, the source electrode of the first transistor T1 is electrically connected to the first node N1, and the drain electrode of the first transistor T1 is electrically connected to the source electrode of the second transistor T2; the second inverting driving signal provided by the second inverting driving signal terminal NGI2 and the Nth stage of driving signal provided by the Nth stage of driving signal output terminal NS(N) are opposite in phase:

The gate electrode of the second transistor T2 is electrically connected to the (N−1)th stage of driving signal output terminal NS(N−1), and the drain electrode of the second transistor T2 is electrically connected to the gating input terminal VCT;

T1 is an n-type transistor, and T2 is an n-type transistor.

Figure 15:
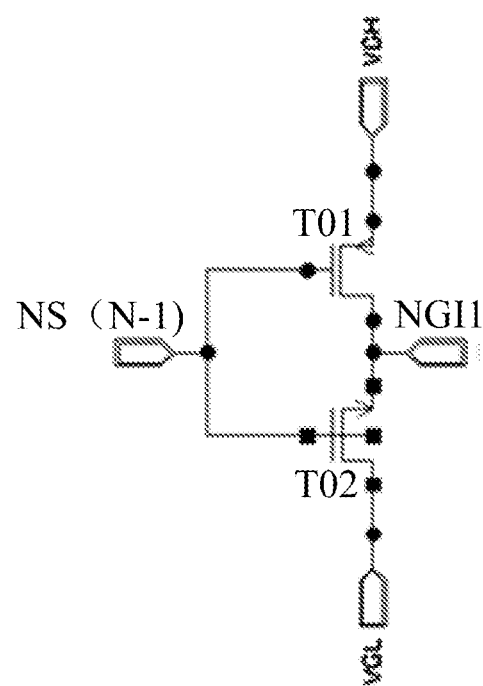
FIG. 15 is a circuit diagram of an inverter according to an embodiment of the present disclosure.

As shown in FIG. 15, the (N−1)th stage of driving signal provided by the (N−1)th stage of driving signal output terminal NS (N−1) can be inverted by the first inverter to obtain the first inverting driving signal provided by the first inverting driving signal terminal NGI1;

The first inverter includes a first inversion control transistor T01 and a second inversion control transistor T02;

T01 is a p-type transistor, and T02 is an n-type transistor.

Figure 16:
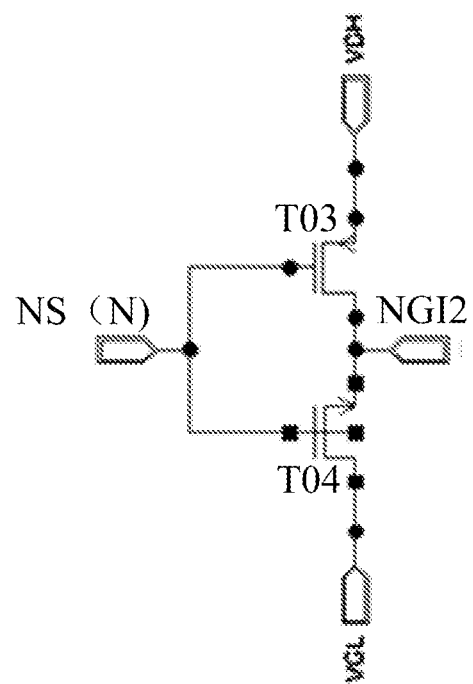
FIG. 16 is a circuit diagram of an inverter according to at least one embodiment of the present disclosure.

As shown in FIG. 16, the Nth stage of driving signal provided by the Nth stage of driving signal output terminal NS(N) can be inverted by the second inverter to obtain the second inverting driving signal provided by the second inverting driving signal terminal NGI2;

The second inverter includes a third inversion control transistor T03 and a fourth inversion control transistor T04;

T03 is a p-type transistor, and T04 is an n-type transistor.

Optionally, the output control circuit includes a third transistor;

A gate electrode of the third transistor is electrically connected to the first node, a first electrode of the third transistor is electrically connected to the first control node, and a second electrode of the third transistor is electrically connected to the second node;

The voltage control circuit includes a first capacitor:

A first terminal of the first capacitor is electrically connected to the first node, and a second terminal of the first capacitor is electrically connected to the second node.

Optionally, the output circuit includes a fourth transistor, a fifth transistor and a second capacitor;

A gate electrode of the fourth transistor is electrically connected to the second node, a first electrode of the fourth transistor is electrically connected to the first voltage terminal, and a second electrode of the fourth transistor is electrically connected to the output driving terminal;

A first terminal of the second capacitor is electrically connected to the second node, and a second terminal of the second capacitor is electrically connected to the first voltage terminal;

A gate electrode of the fifth transistor is electrically connected to the second control node, a first electrode of the fifth transistor is electrically connected to the output driving terminal, and a second electrode of the fifth transistor is electrically connected to the second voltage terminal.

In at least one embodiment of the present disclosure, the driving circuit may further include an initialization circuit;

The initialization circuit is electrically connected to the initial control terminal, the first node and the second voltage terminal, and is configured to control to connect the first node and the second voltage terminal under the control of the initial control signal provided by the initial control terminal.

In specific implementation, the driving circuit may also include an initialization circuit. When the display device is turned on, the initialization circuit controls to connect the first node and the second voltage terminal under the control of the initial control signal, so as to control the potential of the first node to be the second voltage, the output control circuit controls to connect the first control node and the second node under the control of the potential of the first node.

The driving circuit described in at least one embodiment of the present disclosure may further include a first node control circuit:

The first node control circuit is electrically connected to a fourth node, the first node and the second voltage terminal, and is configured to control to connect the first node and the second voltage terminal under the control of a potential of the fourth node.

In a specific implementation, the driving circuit may further include a first node control circuit, and the first node control circuit controls to connect the first node and the second voltage terminal under the control of the potential of the fourth node; after the supply phase of the Nth stage of driving signal, when the potential of the fourth node is a valid voltage, the first node control circuit controls to connect the first node and the second voltage terminal, so that the potential of the first node is the second voltage, the output control circuit controls to connect the first control node and the second node under the control of the potential of the first node.

In at least one embodiment of the present disclosure, when the transistor included in the first node control circuit is a p-type transistor, the valid voltage may be a low voltage, and when the transistor included in the first node control circuit is an n-type transistor, the valid voltage may be a high voltage.

Figure 17:
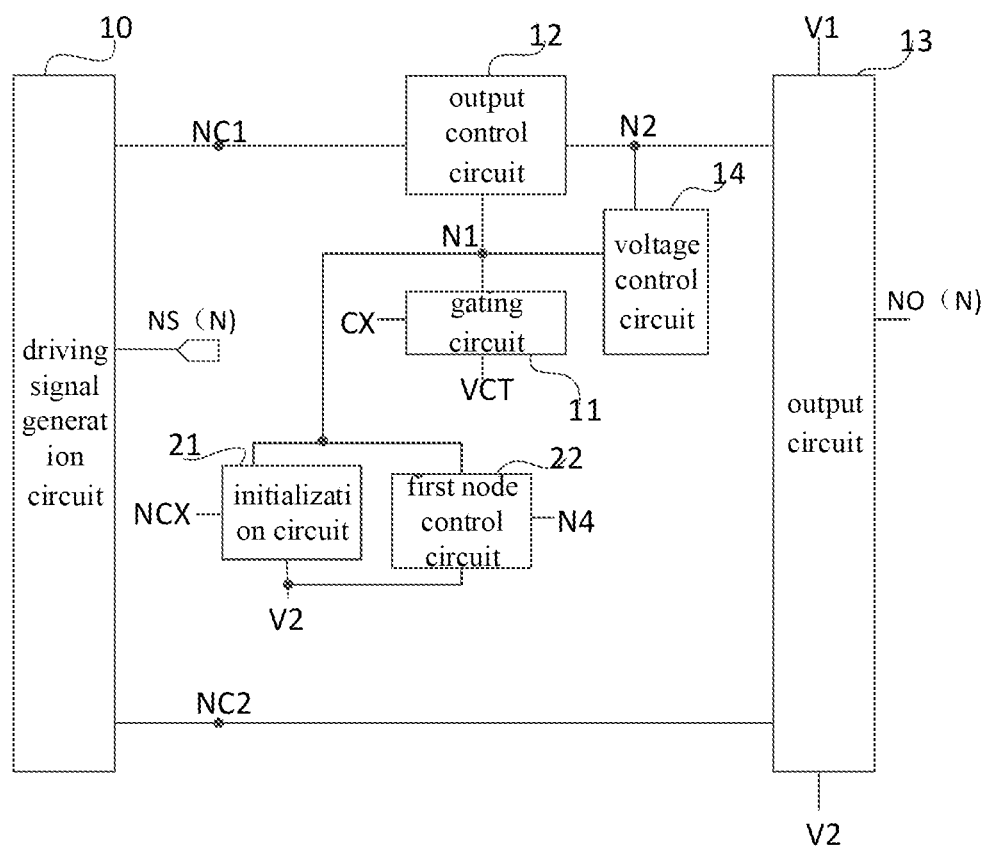
FIG. 17 is a structural diagram of a driving circuit according to at least one embodiment of the present disclosure.

As shown in FIG. 17, on the basis of at least one embodiment of the driving circuit shown in FIG. 1, the driving circuit may further include an initialization circuit 21 and a first node control circuit 22;

The initialization circuit 21 is electrically connected to the initial control terminal NCX, the first node N1 and the second voltage terminal V2 respectively, and is configured to control to connect the first node N1 and the second voltage terminal V2 under the control of the initial control signal provided by the initial control terminal NCX;

The first node control circuit 22 is electrically connected to the fourth node N4, the first node N1 and the second voltage terminal V2 respectively, and is configured to control to connect the first node N1 and the second voltage terminal V2 under the control of the potential of the fourth node N4.

Optionally, the initialization circuit includes a sixth transistor:

A gate electrode of the sixth transistor is electrically connected to the initial control terminal, a first electrode of the sixth transistor is electrically connected to the first node, and a second electrode of the sixth transistor is electrically connected to the second voltage terminal.

Optionally, the first node control circuit includes a seventh transistor;

A gate electrode of the seventh transistor is electrically connected to the fourth node, a first electrode of the seventh transistor is electrically connected to the first node, and a second electrode of the seventh transistor is electrically connected to the second voltage terminal.

In at least one embodiment of the present disclosure, the driving signal generation circuit includes a first control node control circuit, a second control node control circuit, a first driving output circuit, and a second driving output circuit:

The first control node control circuit is configured to control a potential of a first control node:

The second control node control circuit is configured to control a potential of a second control node:

The first driving output circuit is electrically connected to the first control node, the first voltage terminal and the Nth stage of driving signal output terminal respectively, and is configured to control to connect the Nth stage of driving signal output terminal and the first voltage terminal under the control of the potential of the first control node:

The second driving output circuit is electrically connected to the second control node, the Nth stage of driving signal output terminal and the second voltage terminal, and is configured to control to connect the Nth stage of driving signal output terminal and the second voltage terminal under the control of the potential of the second control node.

Figure 18:
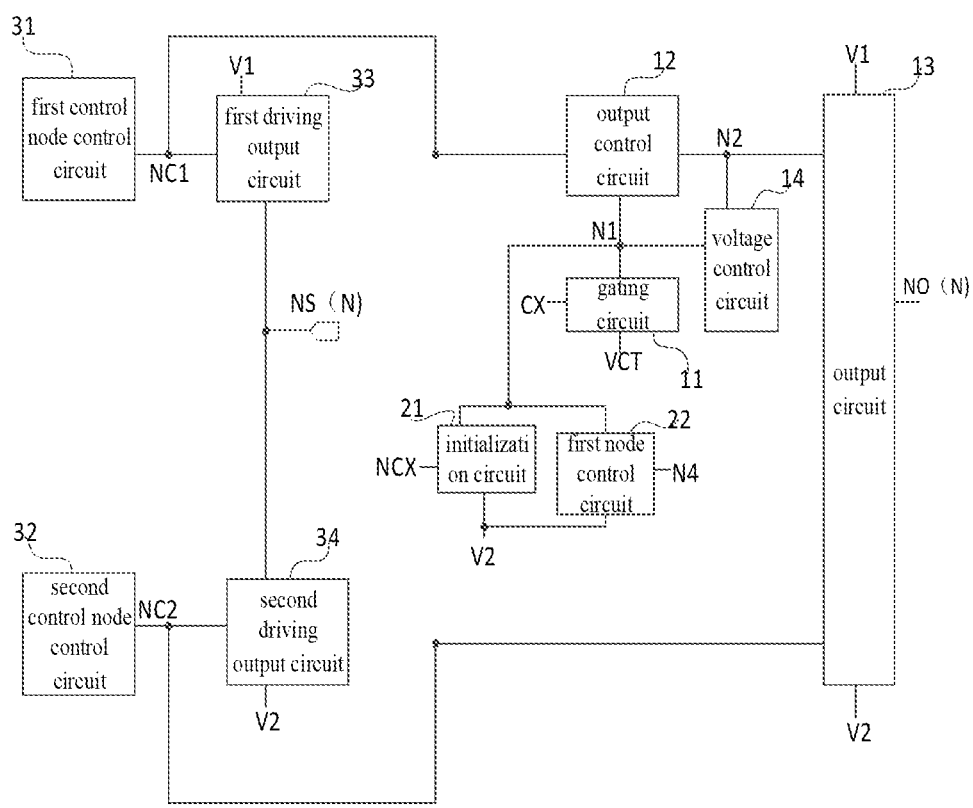
FIG. 18 is a structural diagram of a driving circuit according to at least one embodiment of the present disclosure.

As shown in FIG. 18, on the basis of at least one embodiment of the driving circuit shown in FIG. 17, the driving signal generation circuit includes a first control node control circuit 31, a second control node control circuit 32, a first driving output circuit 33 and a second driving output circuit 34;

The first control node control circuit 31 is electrically connected to the first control node NC1, and is configured to control the potential of the first control node NC1;

The second control node control circuit 32 is electrically connected to the second control node NC2, and is configured to control the potential of the second control node NC2;

The first driving output circuit 33 is electrically connected to the first control node NC1, the first voltage terminal V1, and the Nth stage of driving signal output terminal NS(N), and is configured to control to connect the Nth stage of driving signal output terminal NS(N) and the first voltage terminal V1 under the control of the potential of the first control node NC1;

The second driving output circuit 34 is electrically connected to the second control node NC2, the Nth stage of driving signal output terminal NS(N) and the second voltage terminal V2, and is configured to control to connect the Nth stage of driving signal output terminal NS(N) and the second voltage terminal V2 under the control of the potential of the second control node NC2.

In at least one embodiment of the present disclosure, the first control node control circuit includes a fifth node control circuit, a sixth node control circuit, a third node control circuit, and a first control circuit;

The fifth node control circuit is respectively electrically connected to a first clock signal terminal, the second voltage terminal, a fifth node and a seventh node, and is configured to control to connect the fifth node and the second voltage terminal under the control of the first clock signal provided by the first clock signal terminal, and control to connect the fifth node and the first clock signal terminal under the control of a potential of the seventh node;

The sixth node control circuit is electrically connected to the second voltage terminal, a fifth node and a sixth node, and is configured to control to connect the fifth node and the sixth node under the control of the second voltage signal provided by the second voltage terminal;

The third node control circuit is electrically connected to a sixth node, a second clock signal terminal and the third node, and is configured to control to connect the second clock signal terminal and the third node under the control of the potential of the sixth node, and control the potential of the third node according to the potential of the sixth node;

The first control circuit is electrically connected to the second clock signal terminal, the third node, the first control node, the first voltage terminal and a seventh node, respectively, is configured to control to connect the third node and the first control node under the control of the second clock signal provided at the second clock signal terminal, and control to connect the first control node and the first voltage terminal under the control of the potential of the seventh node.

In specific implementation, the first control node control circuit may include a fifth node control circuit, a sixth node control circuit, a third node control circuit and a first control circuit; the fifth node control circuit controls the potential of the fifth node, the sixth node control circuit controls the potential of the sixth node; the third node control circuit controls the potential of the third node; the first control circuit controls to connect the third node and the first control node under the control of the second clock signal and control to connect the first control node and the first voltage terminal under the control of the potential of the seventh node.

In at least one embodiment of the present disclosure, the second control node control circuit includes a fourth node (N5) control circuit, a seventh node control circuit, an eighth node control circuit, and a second control circuit;

The fourth node control circuit is respectively electrically connected to the fourth node, the fifth node, the first voltage terminal, the eighth node and the second clock signal terminal, and is configured to control to connect the fourth node and the first voltage terminal under the control of the potential of the fifth node, and control to connect the fourth node and the second clock signal terminal under the control of the potential of the eighth node;

The seventh node control circuit is electrically connected to the seventh node, the (N–1)th stage of driving signal output terminal, the first clock signal terminal, the initial control terminal and the first voltage terminal, and is configured to control to connect the seventh node and the (N–1)th stage of driving signal output terminal under the control of the first clock signal provided by the first clock signal terminal, and control to connect the seventh node and the first voltage terminal under the control of the initial control signal provided by the initial control terminal;

The eighth node control circuit is electrically connected to the eighth node, the first clock signal terminal, the second voltage terminal, the (N–1)th stage of driving signal output terminal, the ninth node, and the fourth node, is configured to control to connect the ninth node and the (N–1)th stage of driving signal output terminal under the control of the first clock signal, and control to connect the ninth node and the eighth node under the control of the second voltage signal provided by the second voltage terminal, and control the potential of the eighth node according to the potential of the fourth node;

The second control circuit is electrically connected to the seventh node, the second voltage terminal, the second control node and the eighth node, and is configured to control to connect the second control node and the seventh node under the control of the second voltage signal provided by the second voltage terminal, and control to connect the second control node and the eighth node under the control of the potential of the eighth node.

In specific implementation, the second control node control circuit may include a fourth node control circuit, a seventh node control circuit, an eighth node control circuit, and a second control circuit; the fourth node control circuit controls the potential of the fourth node, the seventh node control circuit controls the potential of the seventh node, the eighth node control circuit controls the potential of the eighth node; the second control circuit controls to connect the second control node and the seventh node under the control of the second voltage signal, and control to connect the second control node and the eighth node under the control of the potential of the eighth node.

Figure 19:
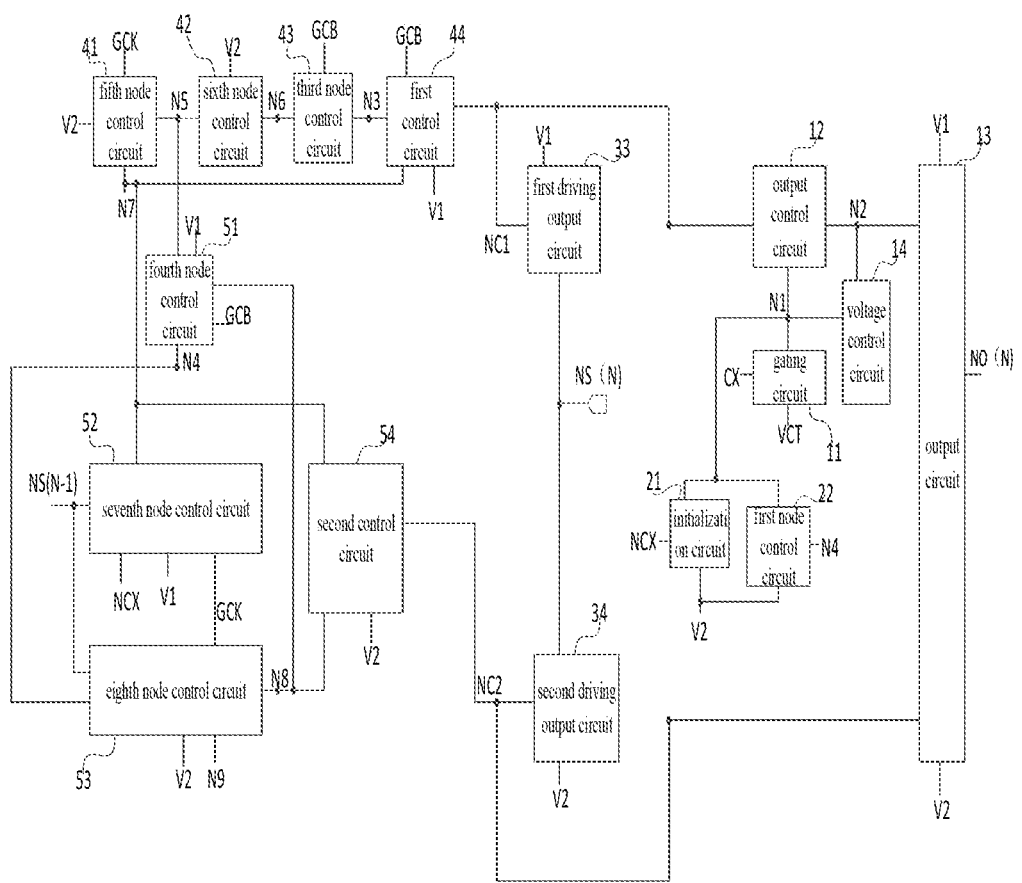
FIG. 19 is a structural diagram of a driving circuit according to at least one embodiment of the present disclosure.

As shown in FIG. 19, on the basis of at least one embodiment of the driving circuit shown in FIG. 18, the first control node control circuit includes a fifth node control circuit 41, a sixth node control circuit 42, a third node control circuit 43 and a first control circuit 44;

The fifth node control circuit 41 is respectively electrically connected to the first clock signal terminal GCK, the second voltage terminal V2, the fifth node N5 and the seventh node N7, and is configured to control to connect the fifth node N5 and the second voltage terminal V2 under the control of the first clock signal provided by the first clock signal terminal GCK, and control to connect the fifth node N5 and the first clock signal terminal GCK under the control of the potential of the seventh node N7;

The sixth node control circuit 42 is electrically connected to the second voltage terminal V2, the fifth node N5 and the sixth node N6 respectively, and is configured to control to connect the fifth node N5 and the sixth node N6 under the control of the second voltage signal provided by the second voltage terminal V2;

The third node control circuit 43 is electrically connected to the sixth node N6, the second clock signal terminal GCB and the third node N3 respectively, and is configured to control to connect the second clock signal terminal GCB and the third node N3 under the control of the potential of the sixth node N6, and control the potential of the third node N3 according to the potential of the sixth node N6:

The first control circuit 44 is respectively electrically connected to the second clock signal terminal GCB, the third node N3, the first control node NC1, the first voltage terminal V1 and the seventh node N7, is configured to control to connect the third node N3 and the first control node NC1 under the control of the second clock signal provided by the second clock signal terminal GCB, and control to connect the first control node NC1 and the first voltage terminal V1 under the control of the potential of the seventh node N7;

The second control node control circuit includes a fourth node control circuit 51, a seventh node control circuit 52, an eighth node control circuit 53 and a second control circuit 54:

The fourth node control circuit 51 is electrically connected to the fourth node N4, the fifth node N5, the first voltage terminal V1, the eighth node N8, and the second clock signal terminal GCB, respectively, is configured to control to connect the fourth node N4 and the first voltage terminal V1 under the control of the potential of the fifth node N5, and control to connect the fourth node N4 and the second clock signal terminal GCB under the control of the potential of the eighth node NB:

The seventh node control circuit 52 is electrically connected to the seventh node N7, the (N−1)th stage of driving signal output terminal NS(N−1), the first clock signal terminal GCK, the initial control terminal NCX and the first voltage terminal V1, respectively, is configured to control to connect the seventh node N7 and the (N−1)th stage of driving signal output terminal NS(N−1) under the control of the first clock signal provided by the first clock signal terminal GCK, control to connect the seventh node N7 and the first voltage terminal V1 under the control of the initial control signal provided by the initial control terminal NCX;

The eighth node control circuit 53 is respectively connected to the eighth node N8, the first clock signal terminal GCK, the second voltage terminal V2, the (N−1)th stage of driving signal output terminal NS(N−1), the ninth node N9 and the fourth node N4, and is configured to control to connect the ninth node N9 and the (N−1)th stage of driving signal output terminal NS(N−1) under the control of the first clock signal, and control to connect the ninth node N9 and the eighth node N8 under the control of the second voltage signal provided by the second voltage terminal V2, and control the potential of the eighth node N8 according to the potential of the fourth node N4;

The second control circuit 54 is electrically connected to the seventh node N7, the second voltage terminal V2, the second control node NC2 and the eighth node N8, respectively, and is configured to control to connect the second control node NC2 and the seventh node N7 under the control of the second voltage signal provided by the second voltage terminal V2, and control to connect the second control node NC2 and the eighth node N8 under the control of the potential of the eighth node N8.

Optionally, the fifth node control circuit includes an eighth transistor and a ninth transistor;

A gate electrode of the eighth transistor is electrically connected to the first clock signal terminal, a first electrode of the eighth transistor is electrically connected to the second voltage terminal, and a second electrode of the eighth transistor is electrically connected to the fifth node;

A gate electrode of the ninth transistor is electrically connected to the seventh node, a first electrode of the ninth transistor is electrically connected to the fifth node, and a second electrode of the ninth transistor is electrically connected to the first clock signal terminal;

The sixth node control circuit includes a tenth transistor;

A gate electrode of the tenth transistor is electrically connected to the second voltage terminal, a first electrode of the tenth transistor is electrically connected to the fifth node, and a second electrode of the tenth transistor is electrically connected to the sixth node:

The third node control circuit includes an eleventh transistor and a third capacitor;

A gate electrode of the eleventh transistor is electrically connected to a sixth node, a first electrode of the eleventh transistor is electrically connected to the second clock signal terminal, and a second electrode of the eleventh transistor is electrically connected to the third node;

A first terminal of the third capacitor is electrically connected to the sixth node, and a second terminal of the third capacitor is electrically connected to the third node;

The first control circuit includes a twelfth transistor and a thirteenth transistor;

A gate electrode of the twelfth transistor is electrically connected to the seventh node, a first electrode of the twelfth transistor is electrically connected to the first control node, and a second electrode of the twelfth transistor is electrically connected to the first voltage terminal;

A gate electrode of the thirteenth transistor is electrically connected to the second clock signal terminal, a first electrode of the thirteenth transistor is electrically connected to the third node, and a second electrode of the thirteenth transistor is electrically connected to the first control node.

Optionally, the fourth node control circuit includes a fourteenth transistor and a fifteenth transistor;

A gate electrode of the fourteenth transistor is electrically connected to the fifth node, a first electrode of the fourteenth transistor is electrically connected to the first voltage terminal, and a second electrode of the fourteenth transistor is electrically connected to the fourth node;

A gate electrode of the fifteenth transistor is electrically connected to the eighth node, a first electrode of the fifteenth transistor is electrically connected to the fourth node, and a second electrode of the fifteenth transistor is electrically connected to the second clock signal terminal;

The seventh node control circuit includes a sixteenth transistor and a seventeenth transistor;

A gate electrode of the sixteenth transistor is electrically connected to the first clock signal terminal, a first electrode of the sixteenth transistor is electrically connected to the (N−1)th stage of driving signal output terminal, and a second electrode of the sixteenth transistor is electrically connected to the seventh node;

A gate electrode of the seventeenth transistor is electrically connected to the initial control terminal, a first electrode of the seventeenth transistor is electrically connected to the first voltage terminal, and a second electrode of the seventeenth transistor is electrically connected to the seventh node;

The eighth node control circuit includes an eighteenth transistor, a nineteenth transistor, and a fourth capacitor;

A gate electrode of the eighteenth transistor is electrically connected to the first clock signal terminal, a first electrode of the eighteenth transistor is electrically connected to the (N−1)th stage of driving signal output terminal, and a second electrode of the eighteenth transistor is electrically connected to a ninth node;

A gate electrode of the nineteenth transistor is electrically connected to the second voltage terminal, a first electrode of the nineteenth transistor is electrically connected to the ninth node, and a second electrode of the nineteenth transistor is electrically connected to the eighth node:

A first terminal of the fourth capacitor is electrically connected to the fourth node, and a second terminal of the fourth capacitor is electrically connected to the eighth node;

The second control circuit includes a twentieth transistor and a twenty-first transistor;

A gate electrode of the twentieth transistor is electrically connected to the second voltage terminal, a first electrode of the twentieth transistor is electrically connected to the seventh node, and a second electrode of the twentieth transistor is electrically connected to the second control node:

A gate electrode of the twenty-first transistor is electrically connected to the eighth node, a first electrode of the twenty-first transistor is electrically connected to the second control node, and a second electrode of the twenty-first transistor is electrically connected to the eighth node.

Optionally, the first driving output circuit includes a twenty-second transistor and a fifth capacitor, and the second driving output circuit includes a twenty-third transistor and a sixth capacitor;

A gate electrode of the twenty-second transistor is electrically connected to the first control node, a first electrode of the twenty-second transistor is electrically connected to the first voltage terminal, and a second electrode of the twenty-second transistor is electrically connected to the Nth stage of driving signal output terminal;

A first terminal of the fifth capacitor is electrically connected to the first control node, and a second terminal of the fifth capacitor is electrically connected to the first voltage terminal;

A gate electrode of the twenty-third transistor is electrically connected to the second control node, a first electrode of the twenty-third transistor is electrically connected to the Nth stage of driving signal output terminal, and a second electrode of the twenty-third transistor is electrically connected to the second voltage terminal:

A first terminal of the sixth capacitor is electrically connected to the Nth stage driving signal output terminal, and a second terminal of the sixth capacitor is electrically connected to the second voltage terminal.

Figure 20:
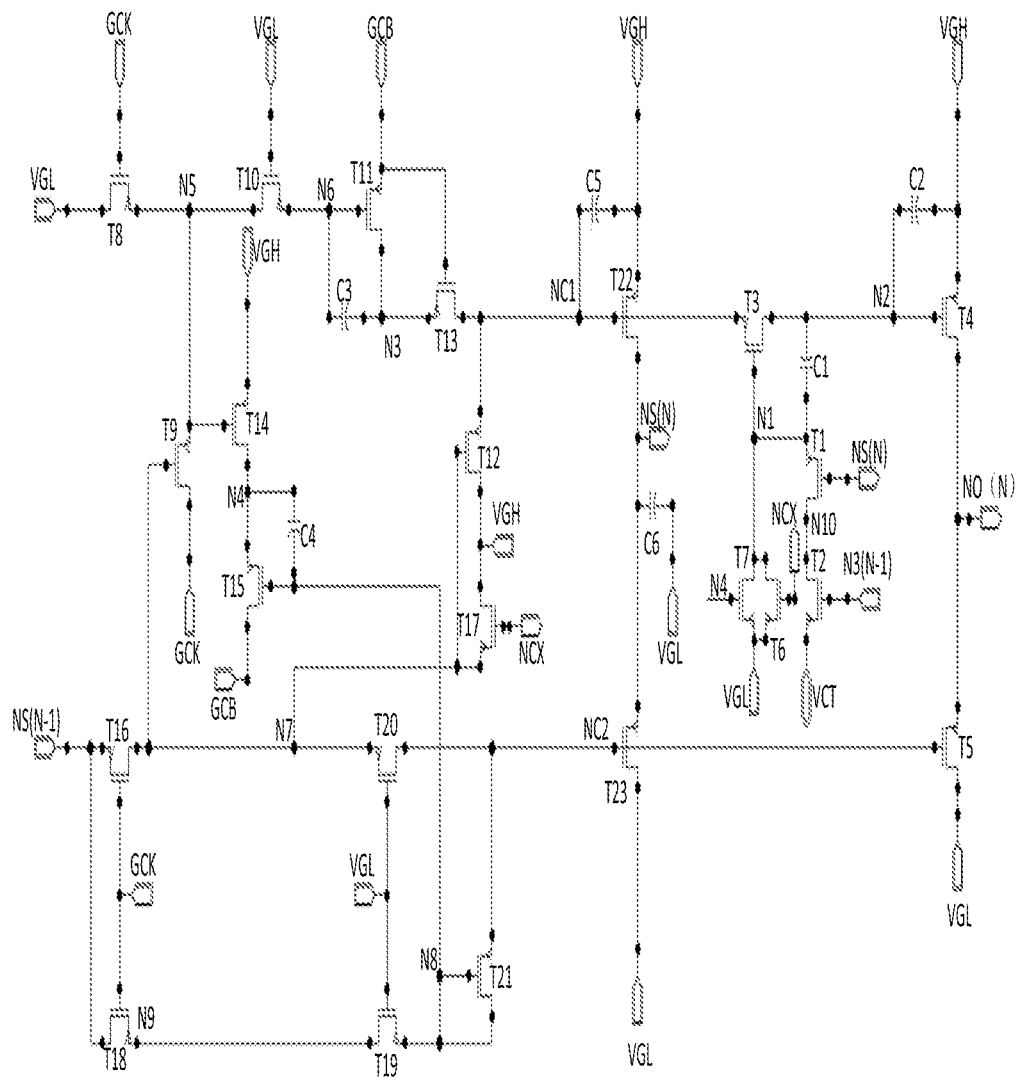
FIG. 20 is a circuit diagram of a driving circuit according to at least one embodiment of the present disclosure.

As shown in FIG. 20, on the basis of at least one embodiment of the driving circuit shown in FIG. 19, The gating circuit includes a first transistor T1 and a second transistor T2;

The gate electrode of the first transistor T1 is electrically connected to the Nth stage of driving signal output terminal NS(N), the drain electrode of the first transistor T1 is electrically connected to the first node N1, and the source electrode of the first transistor T1 is electrically connected to the drain electrode of the second transistor T2;

The gate electrode of the second transistor T2 is electrically connected to the (N−1)th stage of third node N3 (N−1), and the source electrode of the second transistor T2 is electrically connected to the gating input terminal VCT;

The output control circuit includes a third transistor T3;

The gate electrode of the third transistor T3 is electrically connected to the first node N1, the source electrode of the third transistor T3 is electrically connected to the first control node NC1, and the drain electrode of the third transistor T3 is electrically connected to the second node N2:

The voltage control circuit includes a first capacitor C1;

A first terminal of the first capacitor C1 is electrically connected to the first node N1, and a second terminal of the first capacitor C1 is electrically connected to the second node N2.

The output circuit includes a fourth transistor T4, a fifth transistor T5 and a second capacitor C2;

The gate electrode of the fourth transistor T4 is electrically connected to the second node N2, the source electrode of the fourth transistor T4 is electrically connected to the high voltage terminal VGH, and the drain electrode of the fourth transistor T4 is electrically connected to the output driving terminal NO (N);

The first terminal of the second capacitor C2 is electrically connected to the second node N2, and the second terminal of the second capacitor is electrically connected to the high voltage terminal VGH;

The gate electrode of the fifth transistor T5 is electrically connected to the second control node NC2, the first electrode of the fifth transistor T5 is electrically connected to the output driving terminal NO (N), and the drain electrode of the fifth transistor T5 is electrically connected to the low voltage terminal VGL;

The initialization circuit includes a sixth transistor T6;

The gate electrode of the sixth transistor T6 is electrically connected to the initial control terminal NCX, the source electrode of the sixth transistor T6 is electrically connected to the first node N1, and the drain electrode of the sixth transistor T6 is electrically connected to the low voltage terminal VGL;

The first node control circuit includes a seventh transistor T7:

The gate electrode of the seventh transistor T7 is electrically connected to the fourth node N4, the source electrode of the seventh transistor T7 is electrically connected to the first node N1, and the drain electrode of the seventh transistor T7 is electrically connected to the low voltage terminal VGL;

The fifth node control circuit includes an eighth transistor T8 and a ninth transistor T9;

The gate electrode of the eighth transistor T8 is electrically connected to the first clock signal terminal GCK, the source electrode of the eighth transistor T8 is electrically connected to the low voltage terminal VGL, and the drain electrode of the eighth transistor T8 is electrically connected to the fifth node N5;

The gate electrode of the ninth transistor T9 is electrically connected to the seventh node N7, the source electrode of the ninth transistor T9 is electrically connected to the fifth node N5, and the drain electrode of the ninth transistor T9 is electrically connected to the first clock signal terminal GCK;

The sixth node control circuit includes a tenth transistor T10;

The gate electrode of the tenth transistor T10 is electrically connected to the low voltage terminal VGL, the source electrode of the tenth transistor T10 is electrically connected to the fifth node N5, and the drain electrode of the tenth transistor T10 is electrically connected to the sixth node N6;

The third node control circuit includes an eleventh transistor T11 and a third capacitor C3;

The gate electrode of the eleventh transistor T11 is electrically connected to the sixth node N6, the source electrode of the eleventh transistor T11 is electrically connected to the second clock signal terminal GCB, and the drain electrode of the eleventh transistor T11 is electrically connected to the third nodes N3;

A first terminal of the third capacitor C3 is electrically connected to the sixth node N6, and a second terminal of the third capacitor C3 is electrically connected to the third node N3:

The first control circuit includes a twelfth transistor T12 and a thirteenth transistor T13:

The gate electrode of the twelfth transistor T12 is electrically connected to the seventh node N7, the source electrode of the twelfth transistor T12 is electrically connected to the first control node NC1, and the drain electrode of the twelfth transistor T12 is connected to the high voltage Terminal VGH;

The gate electrode of the thirteenth transistor T13 is electrically connected to the second clock signal terminal GCB, the source electrode of the thirteenth transistor T13 is electrically connected to the third node N3, and the drain electrode of the thirteenth transistor T13 is electrically connected to the first control node NC1;

The fourth node control circuit includes a fourteenth transistor T14 and a fifteenth transistor T15;

The gate electrode of the fourteenth transistor T14 is electrically connected to the fifth node N5, the source electrode of the fourteenth transistor T14 is electrically connected to the high voltage terminal VGH, and the drain electrode of the fourteenth transistor T14 is electrically connected to the fourth node N4;

The gate electrode of the fifteenth transistor T15 is electrically connected to the eighth node N8, the source electrode of the fifteenth transistor T15 is electrically connected to the fourth node N4, and the drain electrode of the fifteenth transistor T15 is electrically connected to the second clock signal terminal GCB;

The seventh node control circuit includes a sixteenth transistor T16 and a seventeenth transistor T17;

The gate electrode of the sixteenth transistor T16 is electrically connected to the first clock signal terminal GCK, the source electrode of the sixteenth transistor T16 is electrically connected to the (N−1)th stage of driving signal output terminal NS(N), and the drain electrode of the sixteenth transistor T16 is electrically connected to the seventh node N7:

The gate electrode of the seventeenth transistor T17 is electrically connected to the initial control terminal NCX, the source electrode of the seventeenth transistor T17 is electrically connected to the high voltage terminal VGH, and the drain electrode of the seventeenth transistor T17 is electrically connected to the seventh node N7;

The eighth node control circuit includes an eighteenth transistor T18, a nineteenth transistor T19 and a fourth capacitor C4;

The gate electrode of the eighteenth transistor T18 is electrically connected to the first clock signal terminal GCK, and the source electrode of the eighteenth transistor T18 is electrically connected to the (N−1)th stage of driving signal output terminal NS (N−1), the drain electrode of the eighteenth transistor T18 is electrically connected to the ninth node N9:

The gate electrode of the nineteenth transistor T19 is electrically connected to the low voltage terminal VGL, the source electrode of the nineteenth transistor T19 is electrically connected to the ninth node N9, and the drain electrode of the nineteenth transistor T19 is electrically connected to the eighth node N8;

The first terminal of the fourth capacitor C4 is electrically connected to the fourth node N4, and the second terminal of the fourth capacitor C4 is electrically connected to the eighth node N8;

The second control circuit includes a twentieth transistor T20 and a twenty-first transistor T21:

The gate electrode of the twentieth transistor T20 is electrically connected to the low voltage terminal VGL, the source electrode of the twentieth transistor T20 is electrically connected to the seventh node N7, and the drain electrode of the twentieth transistor T20 is electrically connected to the second control node NC2;

The gate electrode of the twenty-first transistor T21 is electrically connected to the eighth node N8, the source electrode of the twenty-first transistor T21 is electrically connected to the second control node NC2, and the drain electrode of the twenty-first transistor T21 electrically connected to the eighth node N8:

The first driving output circuit includes a twenty-second transistor T22 and a fifth capacitor C5, and the second driving output circuit includes a twenty-third transistor T23 and a sixth capacitor C6;

The gate electrode of the twenty-second transistor T22 is electrically connected to the first control node NC1, the source electrode of the twenty-second transistor T22 is electrically connected to the high voltage terminal VGH, and the drain electrode of the twenty-second transistor T22 is electrically connected to the Nth stage of driving signal output terminal NS(N);

The first terminal of the fifth capacitor C5 is electrically connected to the first control node NC1, and the second terminal of the fifth capacitor C5 is electrically connected to the high voltage terminal VGH;

The gate electrode of the twenty-third transistor T23 is electrically connected to the second control node NC2, the source electrode of the twenty-third transistor T23 is electrically connected to the Nth stage of driving signal output terminal NS(N), and the drain electrode of the twenty-third transistor T23 is electrically connected to the low voltage terminal VGL;

A first terminal of the sixth capacitor C6 is electrically connected to the Nth stage of driving signal output terminal NS(N), and a second terminal of the sixth capacitor C6 is electrically connected to the low voltage terminal VGL.

In at least one embodiment of the driving circuit shown in FIG. 20, the first voltage terminal is a high voltage terminal, and the second voltage terminal is a low voltage terminal, but not limited thereto.

In at least one embodiment of the driving circuit shown in FIG. 20, all transistors are p-type transistors, but not limited thereto.

In at least one embodiment of the driving circuit shown in FIG. 20, N10 is the tenth node.

In at least one embodiment of the present disclosure, the structure of the driving signal generation circuit is not limited to that shown in FIG. 20, the driving signal generation circuit may be 16T3C circuit, 13T3C circuit, 12T3C circuit, 10T3C circuit and so on.

When the driving circuit shown in FIG. 20 of at least one embodiment of the present disclosure is in operation, In the first phase, when NS (N−1) outputs a low voltage signal, GCK outputs a low voltage signal, and GCB provides a high voltage signal. T16 and T18 are turned on, the potential of N7 and the potential of N8 are low voltage, and T20 and T19 are turned on, to ensure that the potential of NC2 and the potential of N8 are low voltage, T23 is turned on, and NS (N) outputs a low voltage signal; the potential of N8 is low voltage to ensure that T15 is turned on, and the potential of N7 is low voltage to turn on T9, T8 and T10 are turned on, the potential of N5 and the potential of N6 are pulled down. T11 is turned on, GCB writes a high voltage signal into N3, and the potential of N7 is low voltage, so as to turn on T12, and the potential of NC1 is pulled up to a high voltage to ensure T22 to be turned off;

In the second phase, NS (N−1) outputs a low voltage signal, the potential of the first clock signal output by GCK jumps from low voltage to high voltage, T16 and T18 are turned off, the potential of N7 is low voltage, T9 is turned on, and T8 is turned off, T10 is turned on, the potential of N5 and the potential of N6 are high voltage, T11 is turned off, the potential of N3 is maintained at high voltage, GCB outputs a low voltage signal, T13 is turned on, the potential of NC1 is maintained at high voltage, and T22 is turned off; at the same time the potential of N8 is maintained at a low voltage, T15 is turned on, GCB writes the low voltage signal into N4, and the potential of N8 is pulled down to a lower voltage (5V-10V lower than the voltage value of the low voltage signal provided by GCB) through C4, T21 is turned on to write the low voltage signal into NC2 (the potential of NC2 is 3-8V lower than the voltage value of the low voltage signal provided by GCB), and T23 is fully turned on to ensure that NS (N) outputs a low voltage signal;

In the third phase, NS (N−1) outputs a high voltage signal, GCK outputs a low voltage signal, GCB outputs a high voltage signal, T16 and T18 are turned on, the potential of N7 and N9 are controlled to be high voltage. T20 and T19 are turned on, the potential of NC2 and the potential of N8 are high voltage, T23 is turned off; the potential of N8 is high voltage, T15 is turned off, the potential of N7 is high voltage, T9 is turned off, T8 is turned on, T10 is turned on, and the potential of N5 and the potential of N6 is pulled down to turn on T11, GCB writes a high voltage signal into N3. T13 is turned off the potential of N7 is high voltage, and T12 is tuned off, and the potential of NC1 is maintained at high voltage to ensure that T22 is turned off;

In the fourth phase, NS (N−1) outputs a high voltage signal, the potential of the first clock signal output by GCK jumps from low voltage to high voltage, GCB outputs a low voltage signal to turn off T16 and T18, and the potential of N7 is high voltage to turn off T9, T8 is turned off. T10 is turned on, the potential of N5 and the potential of N6 are maintained at low voltage, T11 is turned on, T13 is turned on, the potential of N3 and the potential of NC1 are low voltage, T22 is turned on, and NS (N) outputs a high voltage signal; at the same time, the potential of N8 is a high voltage, T15 is turned off, and the potential of N4 remains unchanged, ensuring that the potential of N8 is a high voltage;

In the fifth phase, the potential of the (N−1)th stage of driving signal output by NS (N−1) jumps from high voltage to low voltage, GCK outputs a high voltage signal, GCB outputs a low voltage signal, T16 and T18 are turned off, and the potential of N7 and the potential of N9 are maintained at high voltage, and the potential of other nodes remains unchanged to ensure that NS (N) outputs a high voltage signal:

In the sixth phase, NS (N−1) outputs a low voltage signal, the potential of the first clock signal output by GCK jumps from high voltage to low voltage, GCB outputs a high voltage signal, T16 and T18 are turned on, the potential of N7 and the potential of N8 are low voltage, T20 and T19 are turned on, ensure that the potential of NC2 and the potential of N8 are low voltage, T23 is turned on, NS (N) outputs a low voltage signal; the potential of N8 is low voltage, ensure that T15 is turned on, and the potential of N7 is low voltage, T9 is turned on, T8 is turned on, T10 is turned on, to pull down the potential of N5 and N6, T11 is turned on, GCB writes a high voltage signal to N3, the potential of N7 is low voltage, T12 is turned on, to pull up the potential of NC1 to high voltage, ensure that T22 is turned off.

Optionally, when starting to display (that is, when the display device is on), in order to prevent the display screen from flickering at startup, in the startup phase before the first phase, NCX outputs a low voltage signal, T6 is turned on, and the potential of N1 is low voltage, T3 is turned on; T17 is turned on, the potential of N7 is high voltage, T9 is turned off, when GCK outputs a low voltage signal, T8 is turned on, so that the potential of N5 is low voltage, T10 is turned on, the potential of N6 is low voltage, when GCB outputs a low voltage signal, T13 is turned on, the potential of NC1 is a low voltage, T22 is turned on, and NS (N) outputs a high voltage signal; since T3 is turned on. NC1 and N2 are connected, the potential of N2 is a low voltage, T4 is turned on, and NO (N) outputs a high voltage signal, the second display control transistor M2 included in all pixel circuits in the effective display area are turned on, to clear the residual charge in the storage capacitor Cst, and improve the poor startup screen flicker;

After that, when both NS (N) and N3 (N−1) output low voltage signals, T1 and T2 are tuned on to control to connect VCT and N1;

When VCT provides a low voltage signal, the potential of N1 is low voltage, and C1 maintains the potential of N1; T3 is turned on to control to connect NC1 and N2. At this time, the potential of NC1 is high voltage, and the potential of N2 is high voltage. T4 is turned off, the potential of NC2 is low voltage, T5 is turned on, and NO (N) outputs a low voltage signal:

When VCT provides a high voltage signal, the potential of N1 is a high voltage, T3 is turned off, NC1 and N2 are disconnected, C1 controls the potential of N2 to be a high voltage, T4 is turned off, the potential of NC2 is a low voltage, T5 is turned on, and NO (N) outputs a low voltage signal;

Afterwards, in the supply phase of the Nth stage of driving signal. NS(N) outputs a high voltage signal, at this time, the potential of NC1 is low voltage, and the potential of NC2 is high voltage;

When the potential of N1 is low voltage, T3 is turned on. NC1 and N2 are connected, the potential of N2 is low voltage. T4 is turned on, and NO (N) outputs a high voltage signal:

When the potential of N1 is high voltage, T3 is turned off, NC1 and N2 are disconnected, the potential of N2 is high voltage, the potential of NC2 is high voltage, and NO (N) keeps outputting a low voltage signal:

After the supply phase of the Nth stage of driving signal, when the potential of N4 is low voltage, T7 is turned on to control to connect N1 and VGL, and the potential of N1 is low voltage, T3 is turned on to control to connect NC1 and N2. At this time, the potential of NC1 is high voltage, the potential of NC2 is low voltage, the potential of N2 is high voltage, T4 is turned off, T5 is turned on, and NO(N) outputs a low voltage signal.

When the driving circuit shown in FIG. 20 of at least one embodiment of the present disclosure is working, when N3 (N−1) outputs a low voltage signal and NS (N) outputs a low voltage signal. T1 and T2 are turned on, and the above two signals are simultaneously connected, the state of the gating input signal within a high and low frequency switching period can be obtained.

Figure 21:
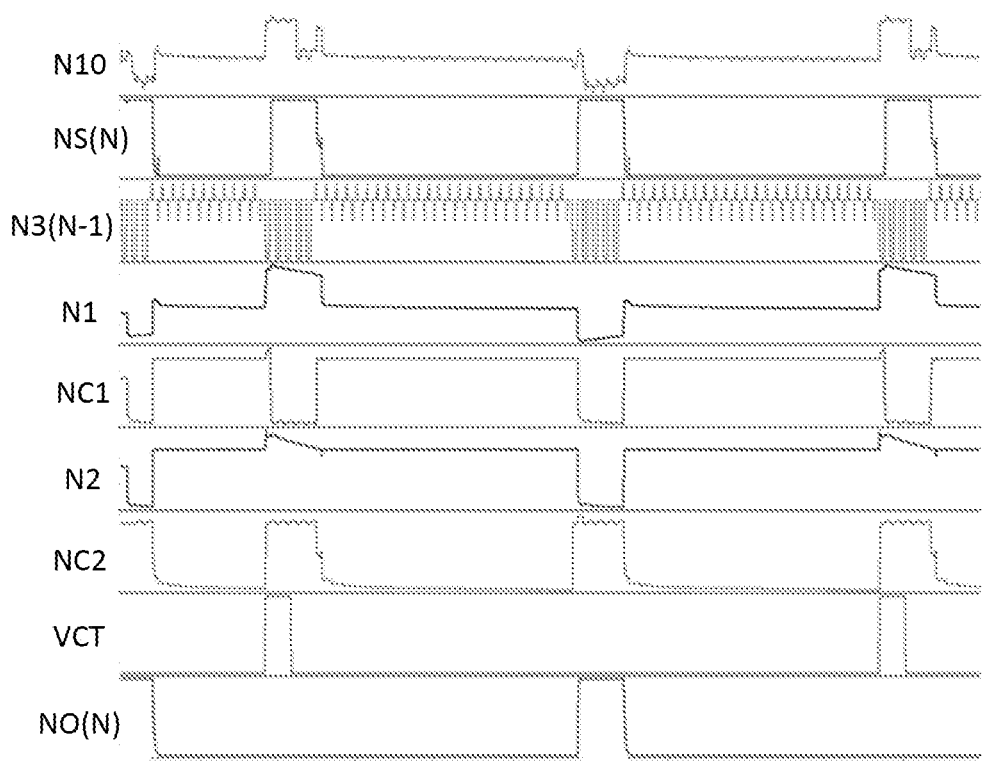
FIG. 21 is a simulation work timing diagram of the driving circuit shown in FIG. 20.
Figure 22:
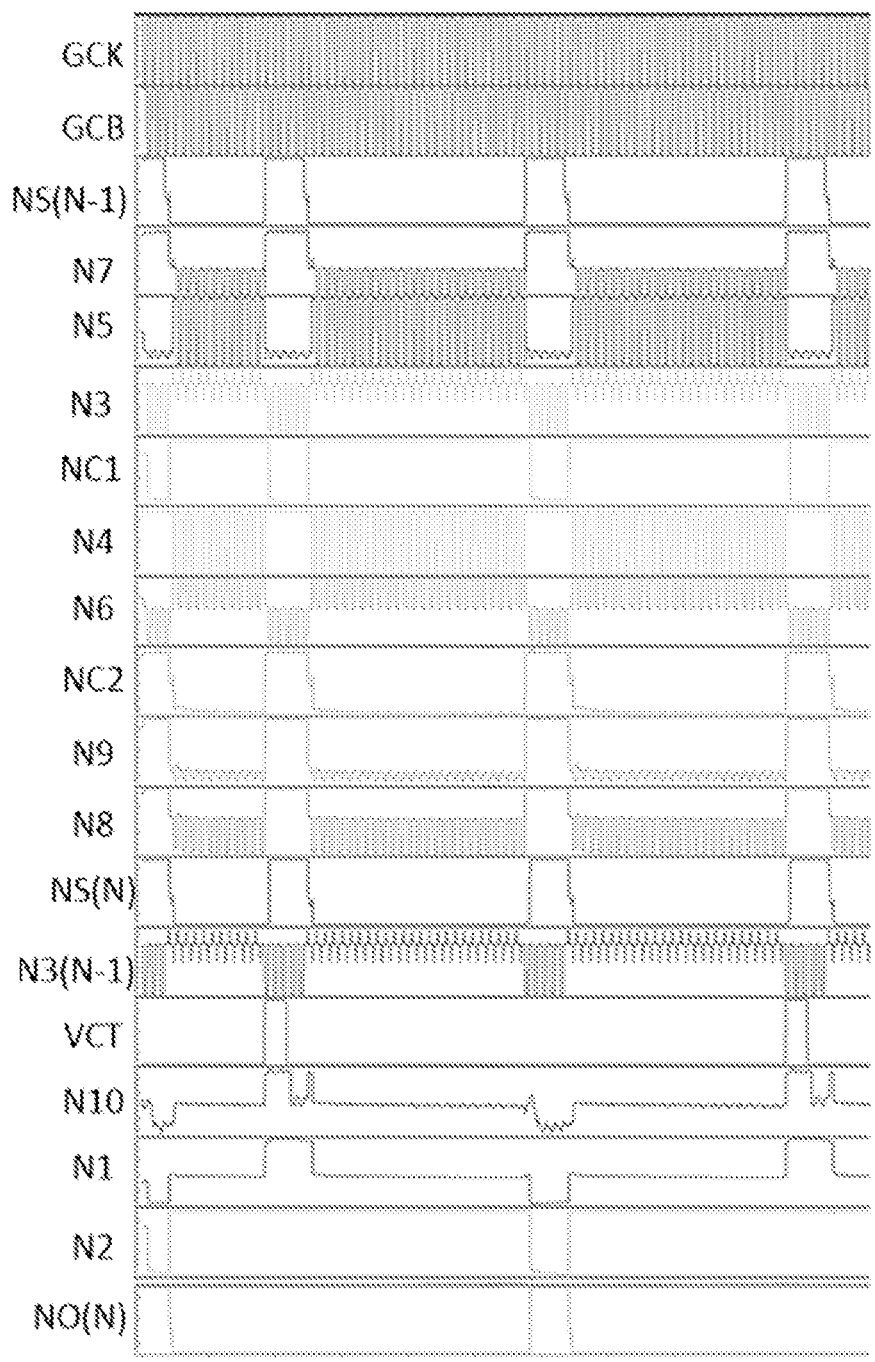
FIG. 22 is a simulation work timing diagram of the driving circuit shown in FIG. 20.

FIG. 21 is a simulation timing diagram of the driving circuit shown in FIG. 20 of at least one embodiment of the present disclosure;

FIG. 22 is a simulation timing diagram of the driving circuit shown in FIG. 20 of at least one embodiment of the present disclosure.

Figure 23:
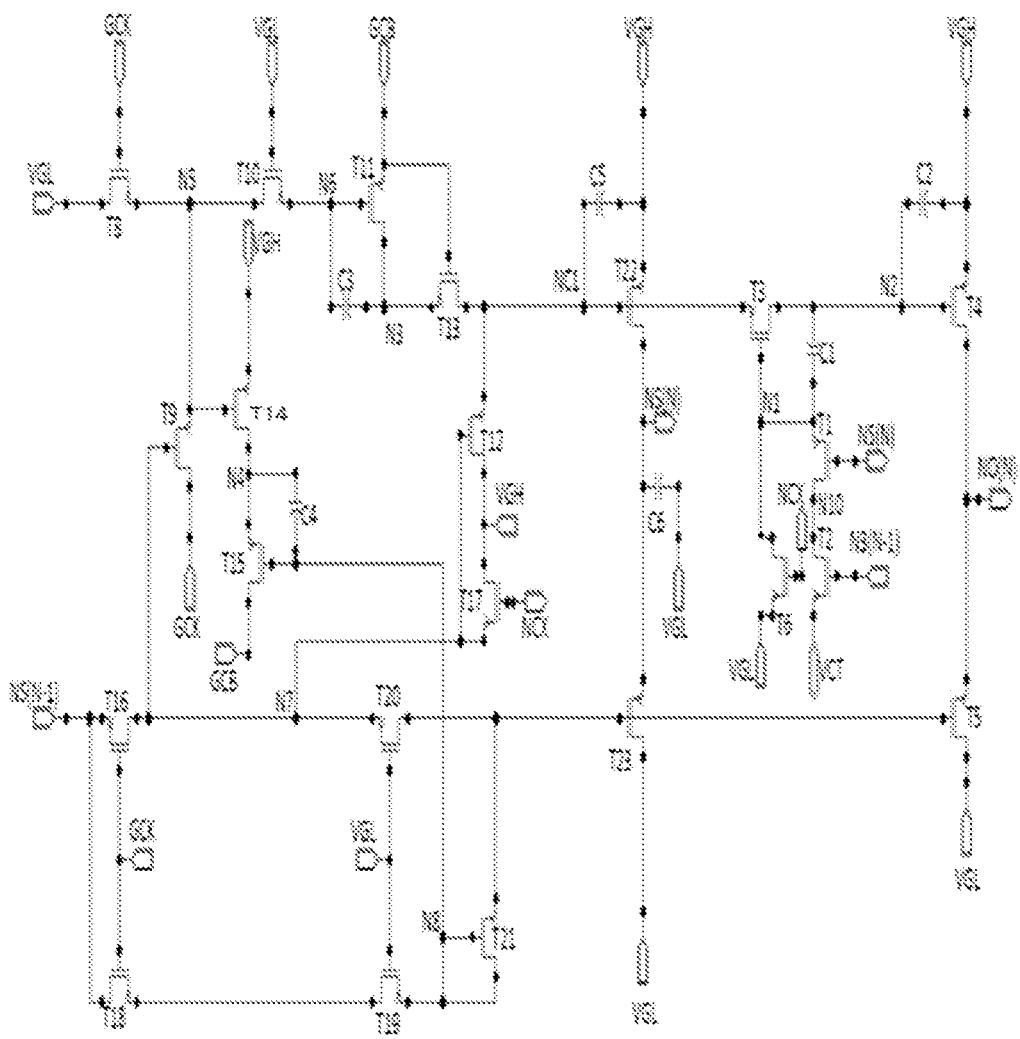
FIG. 23 is a circuit diagram of a driving circuit according to at least one embodiment of the present disclosure.

The difference between at least one embodiment of the driving circuit shown in FIG. 23 of the present disclosure and at least one embodiment of the driving circuit shown in FIG. 20 of the present disclosure is that T7 is not provided.

Figure 24:
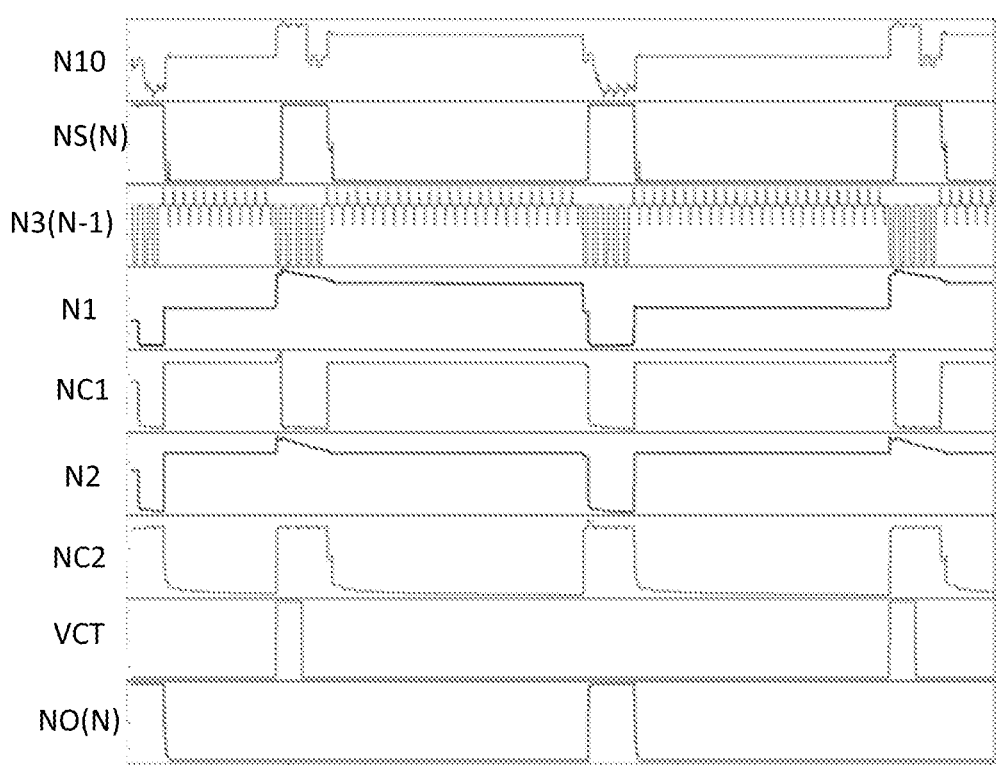
FIG. 24 is a simulation work timing diagram of the driving circuit shown in FIG. 23.

FIG. 24 is a simulation timing diagram of the driving circuit shown in FIG. 23 of at least one embodiment of the present disclosure.

The driving method described in the embodiment of the present disclosure applies to the above-mentioned driving circuit, and the driving method includes:

Generating and outputting, by the driving signal generation circuit, the Nth stage of driving signal through the Nth stage of driving signal output terminal under the control of the potential of the first control node and the potential of the second control node;

Controlling, by the gating circuit, to write the gating input signal provided by the gating input terminal into the first node under the control of the gating control signal:

Controlling, by the output control circuit, to connect the first control node and the second node under the control of the potential of the first node;

Controlling, by the voltage control circuit, the potential of the second node according to the potential of the first node;

Controlling, by the output circuit, to connect the output driving terminal and the first voltage terminal under the control of the potential of the second node, and to connect the output driving terminal and the second voltage terminal under the control of the potential of the second control node.

The driving module described in the embodiment of the present disclosure includes a plurality of stages of the above-mentioned driving circuits.

The Nth stage of driving circuit is electrically connected to the driving signal output terminal of the (N−1)th stage of driving circuit; N is a positive integer.

Figure 25:
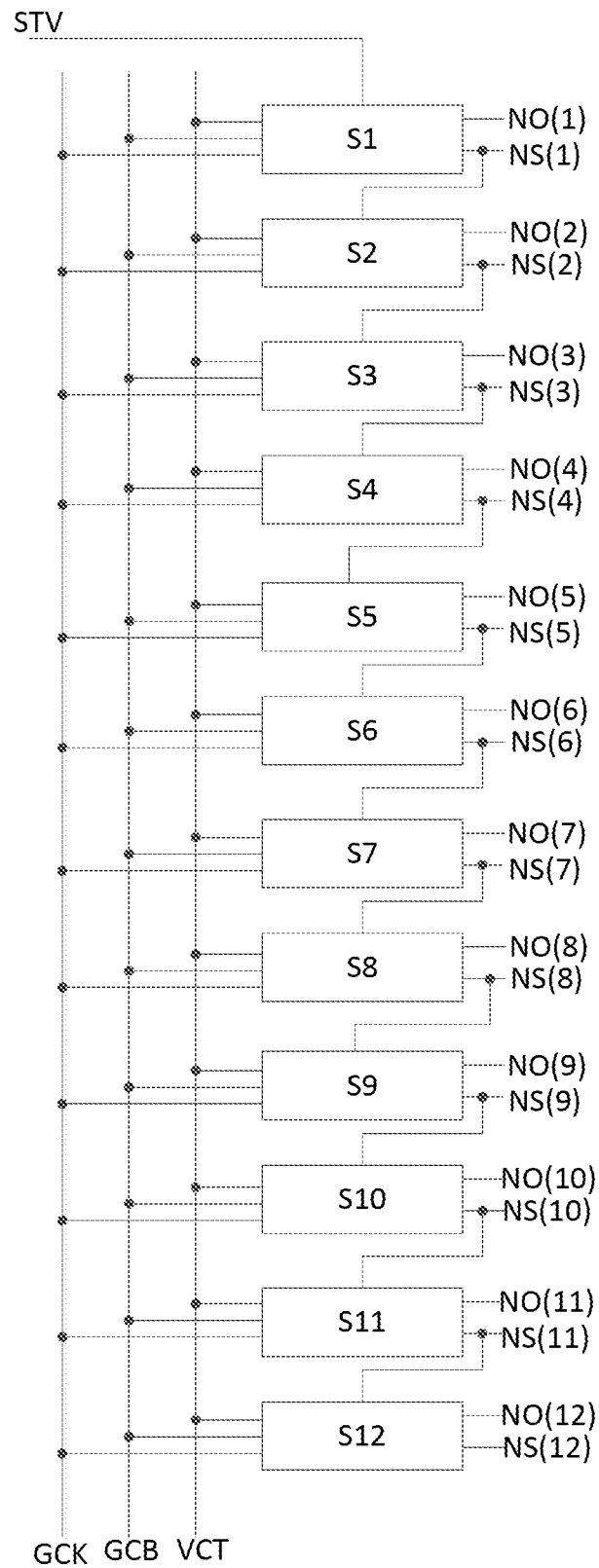
FIG. 25 is a structural diagram of a driving module according to at least one embodiment of the present disclosure.

As shown in FIG. 25, the one labeled S1 is the first stage of driving circuit, the one labeled S2 is the second stage of driving circuit, the one labeled S3 is the third stage of driving circuit, and the one labeled S4 is the fourth stage of driving circuit, the one labeled S5 is the fifth stage of driving circuit, the one labeled S6 is the sixth stage of driving circuit, the one labeled S7 is the seventh stage of driving circuit, the one labeled S5 is the eighth stage of driving circuit, and the one labeled S9 is the ninth stage of driving circuit, the one labeled S10 is the tenth stage of driving circuit, the one labeled S11 is the eleventh stage of driving circuit, and the one labeled S12 is the twelfth-stage of driving circuit;

The one labeled NS (1) is the driving signal output terminal of S1, and the one labeled NO (1) is the output driving terminal of S1;

The one labeled NS (2) is the driving signal output terminal of S2, and the one labeled NO (2) is the output driving terminal of S2; S2 is electrically connected to NS (1);

The one labeled NS (3) is the driving signal output terminal of S3, and the one labeled NO (3) is the output driving terminal of S3; S3 is electrically connected to NS (2):

The one labeled NS (4) is the driving signal output terminal of S4, and the one labeled NO (4) is the output driving terminal of S4; S4 is electrically connected to NS (3);

The one labeled NS (5) is the driving signal output terminal of S5, and the one labeled NO (5) is the output driving terminal of S5; S5 is electrically connected to NS (4);

The one labeled NS (6) is the driving signal output terminal of S6, and the one labeled NO (6) is the output driving terminal of S6; S6 is electrically connected to NS (5);

The one labeled NS (7) is the driving signal output terminal of S7, and the one labeled NO (7) is the output driving terminal of S7; S7 is electrically connected to NS (6);

The one labeled NS (8) is the driving signal output terminal of S8, and the one labeled NO (8) is the output driving terminal of S8; S8 is electrically connected to NS (7):

The one labeled NS (9) is the driving signal output terminal of S9, and the one labeled NO (9) is the output driving terminal of S9; S9 is electrically connected to NS (8);

The one labeled NS (10) is the driving signal output terminal of S10, and the one labeled NO (10) is the output driving terminal of S10; S10 is electrically connected to NS (9):

The one labeled NS (11) is the driving signal output terminal of S11, and the one labeled NO (11) is the output driving terminal of S11; S11 is electrically connected to NS (10);

The one labeled NS (12) is the driving signal output terminal of S12, and the one labeled NO (12) is the output driving terminal of S12; S12 is electrically connected to NS (11);

S1, S2, S3, S4, S5, S6, S7, S8, S9, S10, S11 and S12 are all electrically connected to the gating input terminal VCT;

S1, S2, S3, S4, S5, S6, S7, S8, S9, S10, S11 and S12 are all electrically connected to the first clock signal terminal GCK;

S1, S2, S3, S4, S5, S6, S7, S8, S9, S10, S11 and S12 are all electrically connected to the second clock signal terminal GCB.

In FIG. 25, the one labeled STV is the initial voltage terminal, and S1 is electrically connected to STV.

Figure 26:
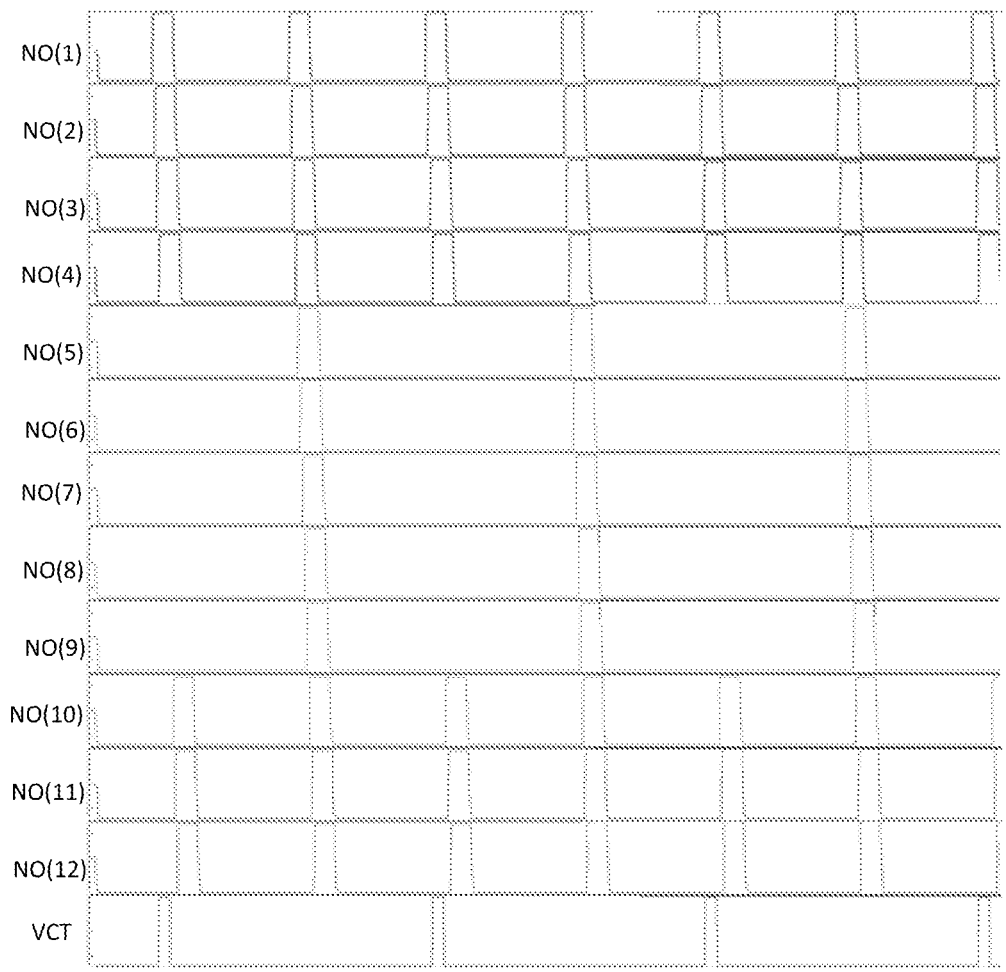
FIG. 26 is a work timing diagram of the driving module shown in FIG. 25.

FIG. 26 is a working timing diagram of the driving module shown in FIG. 25.

When the driving module shown in FIG. 25 of the present disclosure is working, and NS(N−1) outputs a high voltage signal and NS(N) outputs a low voltage signal, if VCT outputs a low voltage signal, then when NS (N) outputs a high voltage signal, NO (N) outputs a high voltage signal:

When NS(N−1) outputs a high voltage signal and NS(N) outputs a low voltage signal, if VCT outputs a high voltage signal, then when NS(N) outputs a high voltage signal, NO(N) outputs a low voltage signal.

Figure 27:
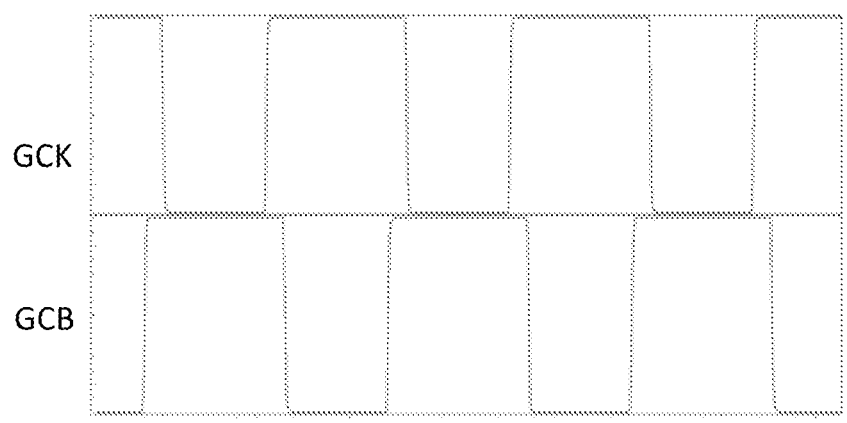
FIG. 27 is a waveform diagram of the first clock signal provided by GCK and the second clock signal provided by GCB.

FIG. 27 is a waveform diagram of the first clock signal provided by GCK and the second clock signal provided by GCB.

The display device described in the embodiment of the present disclosure includes the above-mentioned driving module.

The display device provided by the embodiments of the present disclosure may be any product or component with a display function, such as a mobile phone, a tablet computer, a television, a monitor, a notebook computer, a digital photo frame, a navigator, and the like.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A driving circuit, comprising a driving signal generation circuit, a gating circuit, an output control circuit, a voltage control circuit and an output circuit; wherein the driving signal generation circuit is configured to generate and output an Nth stage of driving signal through an Nth stage of driving signal output terminal under the control of a potential of a first control node and a potential of a second control node;

the gating circuit is electrically connected to a first node, a gating input terminal and a gating control terminal, and is configured to control to write a gating input signal provided by the gating input terminal into the first node under the control of a gating control signal provided by the gating control terminal;

the output control circuit is electrically connected to the first node, a first control node and a second node respectively, and is configured to control to connect the first control node and the second node under the control of a potential of the first node;

the voltage control circuit is electrically connected to the first node and the second node respectively, and is configured to control a potential of the second node according to the potential of the first node;

the output circuit is electrically connected to the second node, the second control node, a first voltage terminal, a second voltage terminal and an output driving terminal respectively, is configured to control to connect the output driving terminal and the first voltage terminal under the control of the potential of the second node, and control to connect the output driving terminal and the second voltage terminal under the control of the potential of the second control node;

N is a positive integer.

2. The driving circuit according to claim 1, wherein the gating circuit is configured to control to write the gating input signal provided by the gating input terminal into the first node when a potential of an (N−1)th stage of third node is a second voltage and the potential of the Nth stage of driving signal is the second voltage.

3. The driving circuit according to claim 1, wherein the gating circuit includes a first transistor; a gate electrode of the first transistor is electrically connected to the gating control terminal, and a first electrode of the first transistor is electrically connected to the first node, a second electrode of the first transistor is electrically connected to the gating input terminal.

4. The driving circuit according to claim 1, wherein the gating control terminal includes a first gating control terminal and a second gating control terminal; the gating circuit includes a first transistor and a second transistor;

a gate electrode of the first transistor is electrically connected to a first gating control terminal, a first electrode of the first transistor is electrically connected to the first node, and a second electrode of the first transistor is electrically connected to a first electrode of the second transistor;

a gate electrode of the second transistor is electrically connected to a second gating control terminal, and a second electrode of the second transistor is electrically connected to the gating input terminal;

the first gating control terminal is an Nth stage of driving signal output terminal, the second gating control terminal is an (N−1)th stage of third node, and both the first transistor and the second transistor are p-type transistors; or, the first gating control terminal is the (N−1)th stage of third node, the second gating control terminal is the Nth stage of driving signal output terminal, and the first transistor and the second transistor are p-type transistors; or, the first gating control terminal is the (N−1)th stage of driving signal output terminal, the second gating control terminal is the Nth stage of driving signal output terminal, the first transistor is an n-type transistor, and the second transistor is a p-type transistor; or, the first gating control terminal is the Nth stage of driving signal output terminal, the second gating control terminal is the (N−1)th stage of driving signal output terminal, the first transistor is a p-type transistor, and the second transistor is an n-type transistor; or, the first gating control terminal is connected to an inversion signal of the (N−1)th stage of driving signal, the second gating control terminal is the Nth stage of driving signal output terminal, the first transistor and the second transistor are both p-type transistors; or, the first gating control terminal is the Nth stage of driving signal output terminal, and the second gating control terminal is connected to the inversion signal of the (N−1)th stage of driving signal; the first transistor and the second transistor are both p-type transistors; or, the first gating control terminal is the (N−1)th stage of driving signal terminal, the second gating control terminal is connected to the inversion signal of the Nth stage of driving signal, and the first transistor and the second transistor are both n-type transistors; or, the first gating control terminal is connected to the inversion signal of the Nth stage of driving signal, the second gating control terminal is the (N−1)th stage of driving signal terminal, and the first transistor and the second transistor are both n-type transistors.

5. The driving circuit according to claim 1, wherein the output control circuit comprises a third transistor;
a gate electrode of the third transistor is electrically connected to the first node, a first electrode of the third transistor is electrically connected to the first control node, and a second electrode of the third transistor is electrically connected to the second node;
the voltage control circuit includes a first capacitor;
a first terminal of the first capacitor is electrically connected to the first node, and a second terminal of the first capacitor is electrically connected to the second node.

6. The driving circuit according to any one of claim 1, wherein the output circuit comprises a fourth transistor, a fifth transistor and a second capacitor;
a gate electrode of the fourth transistor is electrically connected to the second node, a first electrode of the fourth transistor is electrically connected to the first voltage terminal, and a second electrode of the fourth transistor is electrically connected to the output driving terminal;
a first terminal of the second capacitor is electrically connected to the second node, and a second terminal of the second capacitor is electrically connected to the first voltage terminal;
a gate electrode of the fifth transistor is electrically connected to the second control node, a first electrode of the fifth transistor is electrically connected to the output driving terminal, and a second electrode of the fifth transistor is electrically connected to the second voltage terminal.

7. The driving circuit according to claim 1, further comprising an initialization circuit; wherein
the initialization circuit is electrically connected to an initial control terminal, the first node and the second voltage terminal, and is configured to control to connect the first node and the second voltage terminal under the control of an initial control signal provided by the initial control terminal.

8. The driving circuit according to claim 7, wherein the initialization circuit comprises a sixth transistor;
a gate electrode of the sixth transistor is electrically connected to the initial control terminal, a first electrode of the sixth transistor is electrically connected to the first node, and a second electrode of the sixth transistor is electrically connected to the second voltage terminal.

9. The driving circuit according to claim 1, further comprising a first node control circuit; wherein
the first node control circuit is electrically connected to a fourth node, the first node and the second voltage terminal, and is configured to control to connect the first node and the second voltage terminal under the control of a potential of the fourth node.

10. The driving circuit according to claim 9, wherein the first node control circuit comprises a seventh transistor;
a gate electrode of the seventh transistor is electrically connected to the fourth node, a first electrode of the seventh transistor is electrically connected to the first node, and a second electrode of the seventh transistor is electrically connected to the second voltage terminal.

11. The driving circuit according to claim 1, wherein the driving signal generation circuit comprises a first control node control circuit, a second control node control circuit, a first driving output circuit, and a second driving output circuit;
the first control node control circuit is configured to control the potential of the first control node;
the second control node control circuit is configured to control the potential of the second control node;
the first driving output circuit is electrically connected to the first control node, the first voltage terminal and the Nth stage of driving signal output terminal respectively, and is configured to control to connect the Nth stage of driving signal output terminal and the first voltage terminal under the control of the potential of the first control node;
the second driving output circuit is electrically connected to the second control node, the Nth stage of driving signal output terminal and the second voltage terminal, and is configured to control to connect the Nth stage of driving signal output terminal and the second voltage terminal under the control of the potential of the second control node.

12. The driving circuit according to claim 11, wherein the first control node control circuit comprises a fifth node control circuit, a sixth node control circuit, a third node control circuit, and a first control circuit;
the fifth node control circuit is respectively electrically connected to a first clock signal terminal, the second voltage terminal, a fifth node and a seventh node, and is configured to control to connect the fifth node and the second voltage terminal under the control of a first clock signal provided by the first clock signal terminal, and control to connect the fifth node and the first clock signal terminal under the control of a potential of the seventh node;
the sixth node control circuit is electrically connected to the second voltage terminal, a fifth node and a sixth node, and is configured to control to connect the fifth node and the sixth node under the control of the second voltage signal provided by the second voltage terminal;
the third node control circuit is electrically connected to the sixth node, a second clock signal terminal and a third node, and is configured to control to connect the second clock signal terminal and the third node under the control of a potential of the sixth node, and control a potential of the third node according to the potential of the sixth node;
the first control circuit is electrically connected to the second clock signal terminal, the third node, the first control node, the first voltage terminal and the seventh node, respectively, is configured to control to connect the third node and the first control node under the control of the second clock signal provided by the second clock signal terminal, and control to connect the first control node and the first voltage terminal under the control of the potential of the seventh node.

13. The driving circuit according to claim 12, wherein the fifth node control circuit includes an eighth transistor and a ninth transistor;
a gate electrode of the eighth transistor is electrically connected to the first clock signal terminal, a first electrode of the eighth transistor is electrically connected to the second voltage terminal, and a second electrode of the eighth transistor is electrically connected to the fifth node;

a gate electrode of the ninth transistor is electrically connected to the seventh node, a first electrode of the ninth transistor is electrically connected to the fifth node, and a second electrode of the ninth transistor is electrically connected to the first clock signal terminal;

the sixth node control circuit includes a tenth transistor;

a gate electrode of the tenth transistor is electrically connected to the second voltage terminal, a first electrode of the tenth transistor is electrically connected to the fifth node, and a second electrode of the tenth transistor is electrically connected to the sixth node;

the third node control circuit includes an eleventh transistor and a third capacitor;

a gate electrode of the eleventh transistor is electrically connected to the sixth node, a first electrode of the eleventh transistor is electrically connected to the second clock signal terminal, and a second electrode of the eleventh transistor is electrically connected to the third node;

a first terminal of the third capacitor is electrically connected to the sixth node, and a second terminal of the third capacitor is electrically connected to the third node;

the first control circuit includes a twelfth transistor and a thirteenth transistor;

a gate electrode of the twelfth transistor is electrically connected to the seventh node, a first electrode of the twelfth transistor is electrically connected to the first control node, and a second electrode of the twelfth transistor is electrically connected to the first voltage terminal;

a gate electrode of the thirteenth transistor is electrically connected to the second clock signal terminal, a first electrode of the thirteenth transistor is electrically connected to the third node, and a second electrode of the thirteenth transistor is electrically connected to the first control node.

14. The driving circuit according to claim 11, wherein the second control node control circuit comprises a fourth node control circuit, a seventh node control circuit, an eighth node control circuit, and a second control circuit;

the fourth node control circuit is respectively electrically connected to a fourth node, a fifth node, the first voltage terminal, an eighth node and the second clock signal terminal, and is configured to control to connect the fourth node and the first voltage terminal under the control of a potential of the fifth node, and control to connect the fourth node and the second clock signal terminal under the control of a potential of the eighth node;

the seventh node control circuit is electrically connected to a seventh node, the (N−1)th stage of driving signal output terminal, the first clock signal terminal, an initial control terminal and the first voltage terminal, and is configured to control to connect the seventh node and the (N−1)th stage of driving signal output terminal under the control of a first clock signal provided by the first clock signal terminal, and control to connect the seventh node and the first voltage terminal under the control of an initial control signal provided by the initial control terminal;

the eighth node control circuit is electrically connected to an eighth node, the first clock signal terminal, the second voltage terminal, the (N−1)th stage of driving signal output terminal, a ninth node, and a fourth node, is configured to control to connect the ninth node and the (N−1)th stage of driving signal output terminal under the control of the first clock signal, and control to connect the ninth node and the eighth node under the control of the second voltage signal provided by the second voltage terminal, and control a potential of the eighth node according to a potential of the fourth node;

the second control circuit is electrically connected to a seventh node, the second voltage terminal, the second control node and the eighth node, and is configured to control to connect the second control node and the seventh node under the control of the second voltage signal provided by the second voltage terminal, and control to connect the second control node and the eighth node under the control of the potential of the eighth node.

15. The driving circuit according to claim 14, wherein the fourth node control circuit comprises a fourteenth transistor and a fifteenth transistor;

a gate electrode of the fourteenth transistor is electrically connected to the fifth node, a first electrode of the fourteenth transistor is electrically connected to the first voltage terminal, and a second electrode of the fourteenth transistor is electrically connected to the fourth node;

a gate electrode of the fifteenth transistor is electrically connected to the eighth node, a first electrode of the fifteenth transistor is electrically connected to the fourth node, and a second electrode of the fifteenth transistor is electrically connected to the second clock signal terminal;

the seventh node control circuit includes a sixteenth transistor and a seventeenth transistor;

a gate electrode of the sixteenth transistor is electrically connected to the first clock signal terminal, a first electrode of the sixteenth transistor is electrically connected to the (N−1)th stage of driving signal output terminal, and a second electrode of the sixteenth transistor is electrically connected to the seventh node;

a gate electrode of the seventeenth transistor is electrically connected to the initial control terminal, a first electrode of the seventeenth transistor is electrically connected to the first voltage terminal, and a second electrode of the seventeenth transistor is electrically connected to the seventh node;

the eighth node control circuit includes an eighteenth transistor, a nineteenth transistor, and a fourth capacitor;

a gate electrode of the eighteenth transistor is electrically connected to the first clock signal terminal, a first electrode of the eighteenth transistor is electrically connected to the (N−1)th stage of driving signal output terminal, and a second electrode of the eighteenth transistor is electrically connected to a ninth node;

a gate electrode of the nineteenth transistor is electrically connected to the second voltage terminal, a first electrode of the nineteenth transistor is electrically connected to the ninth node, and a second electrode of the nineteenth transistor is electrically connected to the eighth node;

a first terminal of the fourth capacitor is electrically connected to the fourth node, and a second terminal of the fourth capacitor is electrically connected to the eighth node;

the second control circuit includes a twentieth transistor and a twenty-first transistor;

a gate electrode of the twentieth transistor is electrically connected to the second voltage terminal, a first electrode of the twentieth transistor is electrically connected to the seventh node, and a second electrode of the twentieth transistor is electrically connected to the second control node;

a gate electrode of the twenty-first transistor is electrically connected to the eighth node, a first electrode of the twenty-first transistor is electrically connected to the second control node, and a second electrode of the twenty-first transistor is electrically connected to the eighth node.

16. The driving circuit according to claim 11, wherein the first driving output circuit includes a twenty-second transistor and a fifth capacitor, and the second driving output circuit includes a twenty-third transistor and a sixth capacitor;

a gate electrode of the twenty-second transistor is electrically connected to the first control node, a first electrode of the twenty-second transistor is electrically connected to the first voltage terminal, and a second electrode of the twenty-second transistor is electrically connected to the Nth stage of driving signal output terminal;

a first terminal of the fifth capacitor is electrically connected to the first control node, and a second terminal of the fifth capacitor is electrically connected to the first voltage terminal;

a gate electrode of the twenty-third transistor is electrically connected to the second control node, a first electrode of the twenty-third transistor is electrically connected to the Nth stage of driving signal output terminal, and a second electrode of the twenty-third transistor is electrically connected to the second voltage terminal;

a first terminal of the sixth capacitor is electrically connected to the Nth stage driving signal output terminal, and a second terminal of the sixth capacitor is electrically connected to the second voltage terminal.

17. A display device comprising the driving module according to claim 16.

18. A driving method applied to the driving circuit according to claim 1, comprising:

generating and outputting, by the driving signal generation circuit, the Nth stage of driving signal through the Nth stage of driving signal output terminal under the control of the potential of the first control node and the potential of the second control node;

controlling, by the gating circuit, to write the gating input signal provided by the gating input terminal into the first node under the control of the gating control signal;

controlling, by the output control circuit, to connect the first control node and the second node under the control of the potential of the first node;

controlling, by the voltage control circuit, the potential of the second node according to the potential of the first node;

controlling, by the output circuit, to connect the output driving terminal and the first voltage terminal under the control of the potential of the second node, and to connect the output driving terminal and the second voltage terminal under the control of the potential of the second control node.

19. A driving module, comprising a plurality of stages of driving circuit according to claim 1; wherein an Nth stage of driving circuit is electrically connected to a driving signal output terminal included in an (N−1)th stage of driving circuit; N is a positive integer.

* * * * *